United States Patent
Filipovic et al.

(10) Patent No.: US 11,492,114 B1
(45) Date of Patent: *Nov. 8, 2022

(54) HANDY BASE STATION WITH THROUGH BARRIER RADIO FREQUENCY TRANSMISSION SYSTEM AND METHOD

(71) Applicant: Micro Mobio Corporation, Palo Alto, CA (US)

(72) Inventors: Zlatko Aurelio Filipovic, San Jose, CA (US); Guan-Wu Wang, Palo Alto, CA (US); Weiping Wang, Palo Alto, CA (US); Adam Wang, Palo Alto, CA (US); Yi-Hung Chen, Hsinchu (TW)

(73) Assignee: Micro Mobio Corporation, Palo Alto, CA (US)

( * ) Notice: Subject to any disclaimer, the term of this patent is extended or adjusted under 35 U.S.C. 154(b) by 332 days.

This patent is subject to a terminal disclaimer.

(21) Appl. No.: 16/853,715

(22) Filed: Apr. 20, 2020

Related U.S. Application Data

(63) Continuation-in-part of application No. 14/858,183, filed on Mar. 14, 2015, now Pat. No. 10,631,366.

(60) Provisional application No. 61/953,739, filed on Mar. 15, 2014, provisional application No. 62/943,653, filed on Dec. 4, 2019.

(51) Int. Cl.
| | | |
|---|---|---|
| *H04B 7/15* | (2006.01) | |
| *H04W 88/08* | (2009.01) | |
| *B64C 39/02* | (2006.01) | |
| *G08G 5/00* | (2006.01) | |
| *H01K 1/62* | (2006.01) | |

(52) U.S. Cl.
CPC ......... *B64C 39/024* (2013.01); *G08G 5/0069* (2013.01); *H01K 1/62* (2013.01); *H04B 7/15* (2013.01); *H04W 88/08* (2013.01); *B64C 2201/042* (2013.01); *B64C 2201/146* (2013.01)

(58) Field of Classification Search
CPC ........... H04W 88/08; H04B 7/15; H01K 1/62; B64C 9/024; B64C 2201/042; B64C 2201/146; G08G 5/0069
See application file for complete search history.

(56) References Cited

U.S. PATENT DOCUMENTS

| | | | |
|---|---|---|---|
| 3,671,379 A | | 6/1972 | McCain |
| 4,934,983 A | * | 6/1990 | Miyo ........................ H04B 3/10 455/10 |
| 5,161,255 A | * | 11/1992 | Tsuchiya ............... H01Q 1/1285 455/343.6 |
| 5,365,145 A | | 11/1994 | Fields |

(Continued)

*Primary Examiner* — Dominic E Rego
(74) *Attorney, Agent, or Firm* — Roark IP

(57) ABSTRACT

A Handy Base Station (HBS) which is capable of connecting through a base portion into a power socket (e.g., lamp socket). The HBS may have a plurality of functional modules capable of being detachably mounted in a housing. One of the functional modules may be a light emitter such as a light emitting diode (LED). Another module may be a a communication module which may communicate using a wire line or wirelessly using standard wireless communication protocols. Further disclosed is a combination unit which has the HBS located on a pole such as a utility pole with a landing pad for an unmanned aerial vehicle (UAV) to allow the UAV a recharging location between deliveries and to allow the HBS to guide the UAV on its flight.

20 Claims, 21 Drawing Sheets

(56) References Cited

U.S. PATENT DOCUMENTS

| | | | |
|---|---|---|---|
| 5,678,228 A * | 10/1997 | Soleimani | H04B 7/18517 455/12.1 |
| 5,737,684 A * | 4/1998 | Goto | H04B 7/2123 455/430 |
| 6,049,315 A * | 4/2000 | Meyer | H04B 7/15571 343/895 |
| 6,081,232 A * | 6/2000 | Pittman | H01Q 3/46 342/368 |
| 6,603,754 B1 * | 8/2003 | Park | H04B 1/707 370/441 |
| 6,661,386 B1 * | 12/2003 | Petros | H01Q 1/1285 333/24 C |
| 6,684,059 B1 * | 1/2004 | Moerder | H04L 69/161 455/84 |
| 6,810,817 B1 | 11/2004 | James | |
| 7,072,668 B2 | 7/2006 | Chou | |
| 7,091,915 B1 * | 8/2006 | Truthan | H01Q 1/325 343/715 |
| 7,133,697 B2 | 11/2006 | Judd | |
| 7,196,621 B2 | 3/2007 | Kochis | |
| 7,265,668 B1 | 9/2007 | Brosius | |
| 7,356,390 B2 | 4/2008 | Knoblach | |
| 7,660,345 B2 | 2/2010 | Yu | |
| 8,432,258 B2 * | 4/2013 | Wilkinson | H01Q 21/28 340/425.1 |
| 8,511,606 B1 | 8/2013 | Lutke et al. | |
| 8,676,334 B2 * | 3/2014 | Youn | A61N 1/0551 607/48 |
| 8,826,046 B2 | 9/2014 | Lu | |
| 8,831,601 B2 | 9/2014 | Mitchell | |
| 8,880,241 B2 | 11/2014 | Mohamadi | |
| 8,902,777 B1 * | 12/2014 | Huang | H04W 28/0205 370/254 |
| 9,130,651 B2 | 9/2015 | Tabe | |
| 9,369,370 B2 | 6/2016 | Chow | |
| 9,384,668 B2 | 7/2016 | Raptopoulos | |
| 9,387,940 B2 | 7/2016 | Godzdanker | |
| 9,413,501 B2 | 8/2016 | Tellado | |
| 9,481,458 B2 | 11/2016 | Casado Magana | |
| 9,504,099 B2 | 11/2016 | McGuire | |
| 9,572,101 B2 | 2/2017 | Kamijoh | |
| 9,629,220 B2 | 4/2017 | Panopoulos | |
| 9,847,944 B2 | 12/2017 | Chow | |
| 9,885,451 B2 | 2/2018 | Spiro | |
| 9,938,008 B2 | 4/2018 | Stabler | |
| 10,064,095 B2 | 8/2018 | Kerpez | |
| 10,124,908 B2 | 11/2018 | Stabler | |
| 10,247,715 B2 * | 4/2019 | Rossignol | G01N 33/146 |
| 10,530,479 B2 * | 1/2020 | Chow | H04J 1/02 |
| 2003/0104781 A1 * | 6/2003 | Son | H04B 7/15514 455/22 |
| 2004/0038644 A1 * | 2/2004 | Jimenez | H04B 7/15535 455/18 |
| 2004/0066326 A1 * | 4/2004 | Knapp | H01Q 1/1285 455/280 |
| 2004/0110469 A1 * | 6/2004 | Judd | H01Q 21/061 455/562.1 |
| 2004/0192227 A1 | 9/2004 | Beach | |
| 2004/0246891 A1 * | 12/2004 | Kay | H04L 27/0008 370/215 |
| 2006/0071864 A1 * | 4/2006 | Richard | H01Q 1/242 343/702 |
| 2006/0084379 A1 * | 4/2006 | O'Neill | H04B 7/15571 455/25 |
| 2006/0152344 A1 | 7/2006 | Mowery | |
| 2007/0171888 A1 | 7/2007 | Adams | |
| 2007/0237242 A1 * | 10/2007 | Gjertsen | H04B 1/18 375/242 |
| 2008/0149403 A1 | 6/2008 | Fein et al. | |
| 2008/0150295 A1 | 6/2008 | Fein et al. | |
| 2008/0163919 A1 | 7/2008 | Fein et al. | |
| 2008/0252537 A1 * | 10/2008 | Petros | H01Q 1/48 343/700 MS |
| 2009/0021435 A1 * | 1/2009 | Shin | H01Q 1/1271 343/713 |
| 2009/0086655 A1 * | 4/2009 | Ghadaksaz | H04B 7/15542 370/293 |
| 2009/0099761 A1 | 4/2009 | Davis et al. | |
| 2009/0156141 A1 * | 6/2009 | Sulc | H04B 1/40 455/90.2 |
| 2009/0294576 A1 | 12/2009 | LaForge | |
| 2010/0207572 A1 * | 8/2010 | Kirby | H02J 50/10 320/108 |
| 2010/0231163 A1 | 9/2010 | Machinsky | |
| 2010/0002928 A1 | 11/2010 | Lee | |
| 2011/0043301 A1 * | 2/2011 | Huettner | H01P 5/16 333/136 |
| 2011/0084162 A1 | 4/2011 | Goossen | |
| 2011/0140656 A1 | 6/2011 | Starr et al. | |
| 2011/0202221 A1 | 8/2011 | Sobue et al. | |
| 2011/0250819 A1 | 10/2011 | Tashman | |
| 2012/0001497 A1 * | 1/2012 | Sada | H02J 50/502 307/104 |
| 2012/0015603 A1 * | 1/2012 | Proctor, Jr. | H04B 7/15571 455/11.1 |
| 2012/0068896 A1 * | 3/2012 | White | H01Q 1/1271 343/713 |
| 2012/0120243 A1 | 5/2012 | Chien | |
| 2012/0158229 A1 | 6/2012 | Schaefer | |
| 2012/0213254 A1 * | 8/2012 | Yokouchi | H04W 24/08 375/213 |
| 2013/0081245 A1 | 4/2013 | Vavrina | |
| 2013/0143594 A1 * | 6/2013 | Ghabra | H04W 24/00 455/456.1 |
| 2013/0200703 A1 | 8/2013 | Liao | |
| 2013/0217445 A1 | 8/2013 | Chan | |
| 2013/0221757 A1 * | 8/2013 | Cho | B60L 50/20 307/104 |
| 2014/0032034 A1 | 1/2014 | Raptopoulos | |
| 2014/0159673 A1 * | 6/2014 | Han | H02J 50/40 307/104 |
| 2014/0172194 A1 | 6/2014 | Levien et al. | |
| 2014/0172354 A1 | 6/2014 | Chu | |
| 2014/0203939 A1 | 7/2014 | Harrington | |
| 2014/0273892 A1 | 9/2014 | Nourbakhsh | |
| 2014/0274084 A1 | 9/2014 | Ross | |
| 2014/0376370 A1 | 12/2014 | Cioffi | |
| 2015/0016330 A1 | 1/2015 | Schwartz | |
| 2015/0035437 A1 | 2/2015 | Panopoulos | |
| 2015/0123496 A1 * | 5/2015 | Leabman | H02J 50/20 307/151 |
| 2015/0158599 A1 | 6/2015 | Sisko | |
| 2015/0200722 A1 * | 7/2015 | Kang | H04B 7/1555 370/315 |
| 2015/0237706 A1 | 8/2015 | Ben-Moshe | |
| 2016/0221688 A1 | 8/2016 | Moore | |
| 2016/0262113 A1 * | 9/2016 | Diamond | H04W 4/90 |
| 2016/0360511 A1 * | 12/2016 | Barzegar | H04L 5/0003 |
| 2017/0011333 A1 | 1/2017 | Greiner | |
| 2017/0122546 A1 | 5/2017 | Abbott | |
| 2018/0294866 A1 * | 10/2018 | Ashworth | H04B 10/2589 |
| 2019/0002129 A1 | 1/2019 | Walsh | |
| 2019/0223235 A1 | 7/2019 | Schwartz | |
| 2022/0141776 A1 * | 5/2022 | Diamond | H04W 36/32 455/522 |

* cited by examiner

HANDY BASE STATION WITH THROUGH BARRIER RADIO FREQUENCY TRANSMISSION SYSTEM AND METHOD

CROSS-REFERENCE TO RELATED PATENT APPLICATIONS

The present invention claims priority from U.S. Provisional Patent No. 62/943,653, filed Dec. 4, 2019 and U.S. patent application Ser. No. 14/658,183, filed Mar. 14, 2015; which claims priority from U.S. Provisional Patent Application Ser. No. 61/953,739, filed Mar. 15, 2014. The disclosure of all these applications are herein specifically incorporated by reference in their entirety.

FIELD OF THE INVENTION

The present invention relates generally to a housing having a plurality of functional modules capable of being fitted into a power source and an Unmanned Aerial Vehicle (UAV) control, charging and landing station.

BACKGROUND

Incandescent lamps using a tungsten filament are still popular for use as various indicator lamps installed in buildings for offices, condominiums, and public facilities. These lamps provide a plurality of sources of readily available powersupplies.

SUMMARY

Aspects of the disclosure include a Handy Base Station (HBS) comprising: a housing having a base portion that is capable of being fitted into a lamp source socket; and a communication module which is capable of receiving from and transmitting to at least one remote wireless device.

Aspects of the disclosure further include a system comprising: a plurality of poles each having a Handy Base Station (HBS) mounted thereon; each HBS having a base portion that is capable of being fitted into a power source socket and a communication module which is capable of receiving from and transmitting to at least one drone; and each of said plurality of poles having a platform capable of charging the at least one drone.

Aspects of the disclosure further include a system comprising: a plurality of poles each having a Handy Base Station (HBS) mounted thereon; each HBS having a base portion that is capable of being fitted into a power source socket and a communication module which is capable of transmitting to a remote wireless terminal(s).

Aspects of this disclosure may further include a system comprising: a light post having a light fixture; and a landing platform connected to the post and having a charging station capable of recharging an unmanned aerial vehicle (UAV). The charging station may include direct metal contacts integrated into the landing platform for charging the UAV. The charging station may further comprise a transmission wires capable of wirelessly charging a UAV. The transmission wires may also form a transmission coil. The system may further comprise a lamp factor housing attached to the light fixture, wherein the lamp factor housing includes: a base portion that is capable of being screwed into a light-bulb socket; a light-emitting portion that includes a plurality of LEDs which are controlled by a processor; and a communication module also coupled to the processor and which is capable of receiving communications from and transmitting communications to the UAV. The plurality of LEDs may be configured to be off while the communication module is still operating. The landing platform may include a plurality of magnets configured to hold a UAV in position for charging. The landing platform may further comprise: a module for generating a laser beam capable of guiding a UAV to the landing platform. The laser beam may be pulsed and/or modulated to guide the UAV. The lamp factor housing may be capable of wirelessly controlling the UAV when it is within range. In the system, the landing platform may have a plurality of attachments so that it is capable of being affixed to the side of a building. A beacon may be mounted on the light post which is capable of sending signals to and receiving signals from a UAV and wherein the beacon may communicate with the UAVs using a wireless standard selected from the group consisting of: 3G, 4G, 5G, WiFi, WiFi Direct, Bluetooth®, and WiMax®. In the system, the landing platform may have a communication module which is capable of forwarding signals received on the status of a UAV and be capable of electronically paying for goods dropped off by the UAV through the beacon in a wireless link with the UAV.

Further aspects of the disclosure may include a system comprising: a plurality of poles each having Handy Base Stations (HBS's) mounted thereon; each HBS having a base portion that is capable of being fitted into a power source socket and a communication module which is capable of transmitting to a remote wireless terminal. The communication module communicates to the remote wireless terminal in at least one communication standard of the group consisting of: microwave and millimeter wave (mm-wave). The network is a backhaul fiber optic. The remote wireless terminal is located in one of the group consisting of a: vehicle, aerial drone, another HBS, and a mobile device.

Further aspects of the disclosure may include a system comprising: a plurality of vehicles each having Handy Base Stations (HBS's) mounted thereon; each HBS having a base portion that is capable of being fitted into a power source socket and a communication module which is capable of transmitting to a remote wireless terminal. The communication module communicates to the remote wireless terminal(s) in at least one communication standard of the group consisting of: microwave and millimeter wave (mm-wave). The remote wireless terminal is located in or mounted on one of the group of moving objects consisting of a: automotive vehicle, Unmanned Aerial Vehicle (UAV), another HBS, and a mobile device. At least one of the HBS's includes a power module configured to provide electricity to other modules in the HBS generated from kinetic energy of the vehicle. At least one of the plurality of vehicles is an Unmanned Aerial Vehicle (UAV). The communication module communicates to the remote wireless terminal at least one of the group consisting of: sensor data, image data, video data, and vehicle control and command data.

Further aspects of the disclosure may include a system comprising: a plurality of light posts each having a light fixture; a landing platform connected to each of the plurality of light posts and each said landing platform having a charging station capable of recharging an unmanned aerial vehicle (UAV); and wherein each of the landing platforms has a communication device capable of tracking UAVs.

Further aspects of the disclosure may include a method comprising: landing a UAV on a lamp post containing a charging station; and wirelessly charging through induction a UAV. The lamp post may include a lamp factor housing which has a communication module which receives communications from and transmits communications to the UAV. The method may further include guiding the UAV to the charging station using a laser. The method of may further comprise: holding the UAV in place during charging using magnets.

Further aspects of the disclosure may include a communication device comprising: a first unit having a first antenna, a second antenna, and a first signal transmitting and receiving circuitry; a second unit having a third antenna, a fourth antenna, and a second signal transmitting and receiving circuitry, wherein the second unit is located in proximity to the first unit; wherein the second unit is capable of receiving signals at a first radio frequency (RF) signal frequency, amplifying the first wave signal in a low noise amplifier, and autonomously transmitting the signals through a barrier to the first unit; and wherein the first unit is capable of transmitting signals at the first millimeter wave signal frequency.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
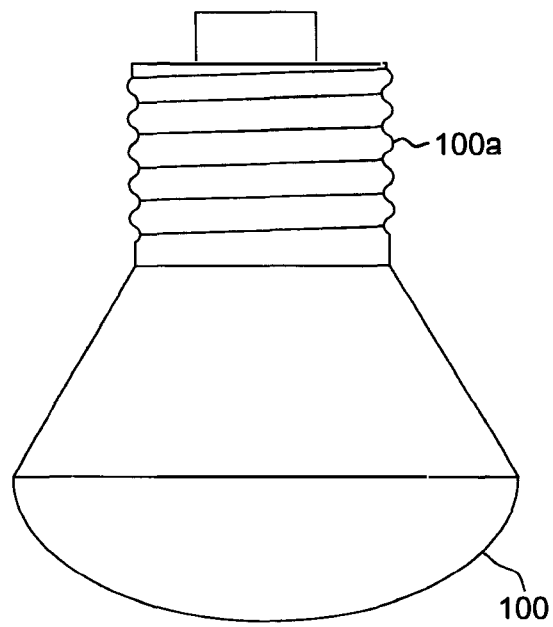
FIG. 1 is a side view of a typical housing for a Handy Base Station (HBS).

In the following description, numerous details are set forth to provide a more thorough explanation of embodiments of the present invention. It will be apparent, however, to one skilled in the art, that embodiments of the present invention may be practiced without these specific details. In other instances, structures and devices are shown in block diagram form, rather than in detail, in order to avoid obscuring embodiments of the present invention. In addition, reference element numbers used in one figure are also the same as reference elements in different figures and function in a similar way.

One of the major difficulties of in the Internet of Things (IOT), connected environments, and/or network black spots is the lack of easy access to power and data backhaul. Such environments require expensive deployments such as site acquisitions and digging roads for backhaul. These are some of the type of problems address by the methods and systems disclosed herein. Sockets acting as a power source for housings (e.g., such as light emitter housings) can be found everywhere (vehicles, walls, street corners, signs, poles, etc.) therefore making it an ideal location for a Handy Base Station (HBS) described herein. With an ease of access to Alternating Current (AC)/Direct Current (DC) power lines, an HBS having access to a power source can easily transform any location into an IOTs, connected environment to form a patch of network black spots. With, for example, a lamp base, the HBS can be easily installed into a standard power socket of a lamp, a lighting fixture, or a light pole and be connected to a power line. The power socket can be indoor in buildings or outdoors on public or private properties (e.g., public lands, parking lots, streets, roads, highways, or on vehicles). HBS can use the power lines or Ethernet over Power Lines to draw power and for data backhaul. The HBS could also have a built in wireless backhaul module to provide wireless data backhaul. HBS can function as an Access Point, a small cell (e.g., pico, femto, macro micro), a repeater, a backhaul point, public safety system, and/or early warning system. HBS can use wireless standards, such as third generation of mobile telecommunications technology (3G), fourth generation of mobile telecommunications technology (4G), fifth generation mobile networks (5G), Wireless Fidelity (IEEE 802.11—WiFi), millimeter wave (mm-wave), microwave, Worldwide Interoperability for Microwave Access (IEEE 802.16—WiMAX), Long Term Evolution, and other similar standards allowing for quick and cost effective network coverage. HBS can be equipped with cameras, lights, sensors (e.g., smoke, temperature, wind and airflow, carbon monoxide), three dimensional image mapping, infrared sensor, long and short range motion sensors, speaker(s), microphone(s), biochemical sensor(s), sound, ultra sound emitter/receiver, and/or radar. All these sensors and components can provide critical data for policing, early warnings, and/or home safety.

In other applications, most vehicles are not connected and do not have collision avoidance systems. A version of the HBS can be installed into a vehicles' light emitter housing to make vehicles smart and to assist drivers in avoiding accidents. The HBS could be installed in the front, back or side of vehicles.

In other embodiments disclosed herein, as Unmanned Aerial Vehicles (UAV's) cover longer and longer miles in rural and densely populated areas, UAV's battery life and long distance communications will be the key to a successful UAV deployment. In order for UAV's to fly long distance constant battery charging is a must as battery capacity on UAV's is quite small due to payload/cost requirements. Keeping communication open with a long distance UAV is also critical. Today's technology allows UAV's to fly short distance/short time with short distance communication and navigation. Communication between an HBS and a UAV might include communications of sensor data, image data, video data and UAV control and command data. As will be discussed herein the communication relationship between an HBS mounted on a pole, building, hilltop or similarly situation spot and a UAV can also be implemented between an HBS and a land-based vehicle, a manned aerial vehicle and/or a marine vessel. The HBS may conduct communications with all three types of vehicles simultaneously depending on the type of communication modules integrated into the HBS. The communication with these 4 type of vehicles (UAV, manned aerial vehicle, land vehicle, and/or marine vessel) may occur while they are stationary or in motion. A network of HBS's can relay high rate data such as sensor, image and/or video data from the 4 types of vehicles to cloud servers or vehicles/traffic control centers. Another feature that may be integrated into the HBS is a UAV landing module. The UAV landing module may contain navigation and wireless communication functions or, alternatively, the UAV landing module might be coupled to a separate navigation module and wireless communication module. A UAV charging pad might also be coupled electronically to the HBS for control and charging of a UAV.

The Handy Base Station (HBS) may have a plurality of electronic devices and functions integrated inside a housing having access to standard power socket. For example, the HBS may be contained in a traditional lamp form factor housing. (The HBS may also be referred to interchangeably in this description as a "Smart Lightcan"). In the following description, alternative embodiments of the HBS are described including reference numerals 100, 300, 300a, 400, 702, 1200, 1204, 1206, 1306a, 1308a, 1310a, 1312a-1312d, 1404, 1504 and 1706 in FIGS. 1-18. It is to be understand that the electronic and mechanical devices and functions described with respect to one exemplary embodiment of the HBS can be used in part or in whole in the other exemplary embodiments as well even if the electrical and mechanical devices and functions are not specifically shown in a particular embodiment but rather described in a different embodiment.

Figure 2:
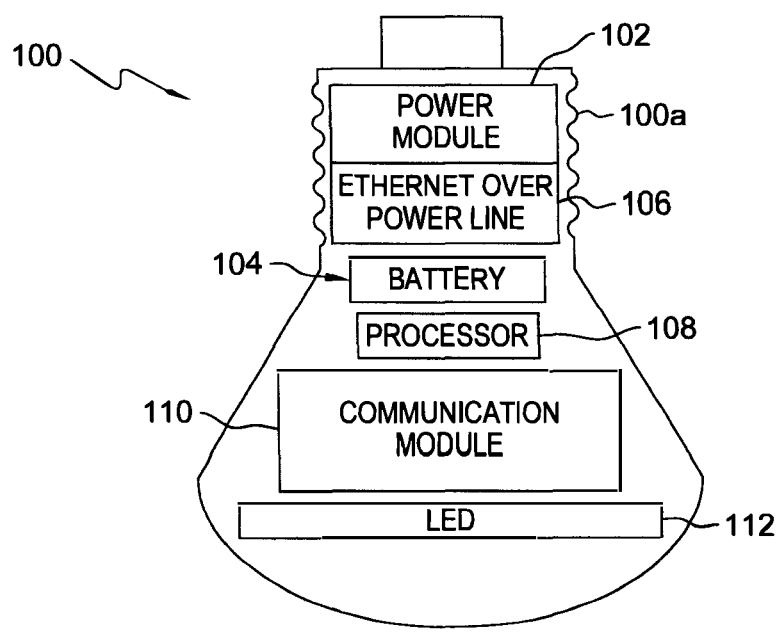
FIG. 2 is a cross-sectional view of the HBS of FIG. 1.

FIG. 1 is a side view of an HBS 100 having an attachment section or base (e.g., screw) 100a for attaching the housing 100 to a corresponding power socket of a light fixture (not shown). For example, the attachment section is typically constructed to be capable of being fitted into a conventional light socket. Therefore, the HBS 100 can be easily installed by screwing, using prongs or some other form of attachment into a power source socket located on a street light post, house ceiling, vehicles, or a variety of other installations. FIG. 2 is a cross-sectional view of the HBS 100 of FIG. 1. The housing of the HBS 100 may provide light by a light emitting diode (LED) or a plurality of LEDs, incandescent bulb(s), fluorescent light(s), sodium light(s) or similar to light up the house, streets, parking lot, and/or show the road at night for cars. In an alternative embodiment, the HBS 100 may not include any lighting emitting element but still have a housing capable of being plugged, screwed or connected through some other form of attachment into a power socket.

The housing of HBS 100 shown in FIG. 2 includes a power module 102, a communication module 110, a light emitting source module (e.g., LED) 112, processor 108, and sensors (not shown). The modules may be miniaturized and as they are plugged into the HBS 100 they are configured to establish an electrical connection with, for example, a universal serial bus (USB) that runs throughout the HBS 100. The modules may be fitted into slots on a core section of the HBS 100. In alternative embodiments, the HBS 100 could contain a printed circuit board into which the modules are plugged. The modules are functional modules and all or a subset of all of the modules may be detachable from the HBS 100 as discussed below. With a light bulb screw-in base 100a, the HBS 100 can easily be installed into the power socket of a lamp, a lighting fixture, or a light pole connecting to a power line from the main power grid or another power generator. Such a power socket can be indoor in buildings or outdoor in private properties, public lands, parking lots, streets, roads, highways, or on vehicles. Power module 102 is used to deliver and control power to the components and modules of the HBS 100. The HBS 100 draws power from the power line to feed the power module 102. The power module 102 may further include a backup battery 104 for operation when the power line is not providing power. If the optional, detachable backup battery 104 is present it may be charged by the power module 102. The power module 102 may include a switch, an alternating current (AC)/direct current (DC) converter for AC power source, or a DC/DC converter for DC power source for voltages suitable to operate other modules such as the communication module, light emitter 112, sensors and any other electrical/mechanical components or modules located in the HBS 100. The USB may be used to electrically connect the modules and components such as LED 112 to the power module 102. The power module 102 may also be configured to provide electricity generated from kinetic energy gained due to movement of the HBS 100 from being mounted on a vehicle (e.g., acceleration and deceleration of the vehicle). Ethernet over Power Line unit 106 may be connected to the power module 102 or be part of the power module 102 and enable wired communication on the part of the HBS 100 typically through a utility company which provides their own Internet service. Processor 108 controls the operation of the HBS 100 and may be an ARM® processor or other similar type. Any of the functions described herein with reference to FIGS. 1-16J may be controlled by the processor 108 located in an HBS.

Communication module 110 is coupled to the processor 108 and Ethernet over Power Line unit 106 and is used for communication, networking, command and control. The communication module 110 may be used to send and receive data or forward the data to a second HBS (either wirelessly or over a hardline such as by Ethernet Over Power Line) typically located nearby. The control module 110 may allow for a wireless connection to an access point (AP) (e.g., WiFi Access Point) with the Ethernet as a source for wireless backhaul. The term "backhaul" as used in this description shall be the implementation of wireless communications systems to transfer data from an end user to a node in a major network such as the Internet. The communication module 110 can be a wired type which communicates using wire line(s), e.g., Ethernet over Power Line. Alternatively, the communication module 110 can be wireless type using standard wireless communication protocols to interact with local mobile devices, a base station, and/or another HBS. Communication protocols may include Global System for Mobile Communication (GSM), Enhanced Data GSM Environment (EDGE), Code Division Multiple Access (CDMA), Wideband CDMA (WCDMA), Long Term Evolution (LTE) cellular Wireless Wide Area Network (WWAN) standards, Wireless Local Area Network (WLAN) IEEE 802.11 Wi-Fi standards, Worldwide Interoperability for Microwave Access (WiMax), Millimeter Wave Wireless Communications (mm-wave), microwave and/or Zigbee®. In remote areas, the HBS 100 may transfer data by satellite based communications, drones, and/or hovering blimps. The HBS 100 may also act as a client or a host for other wireless devices or Handy Base Stations. The HBS 100 can wirelessly detect other Handy Base Stations within the area automatically and may also control the other Handy Base Stations or be controlled by them. The HBS 100 in turn may also be controlled by users via a mobile communication device, personal computer (PC), mobile phone tablet or other device. Typically, a software application on these devices would be used as a control means. Functionally, the HBS 100 may be used as a repeater, Access Point, mesh network, small cell (e.g., picocell, femtocell, macrocell, microcell, etc.), public safety system, early warning system, and/or (as previously discussed) a backhaul point.

Figure 3A:
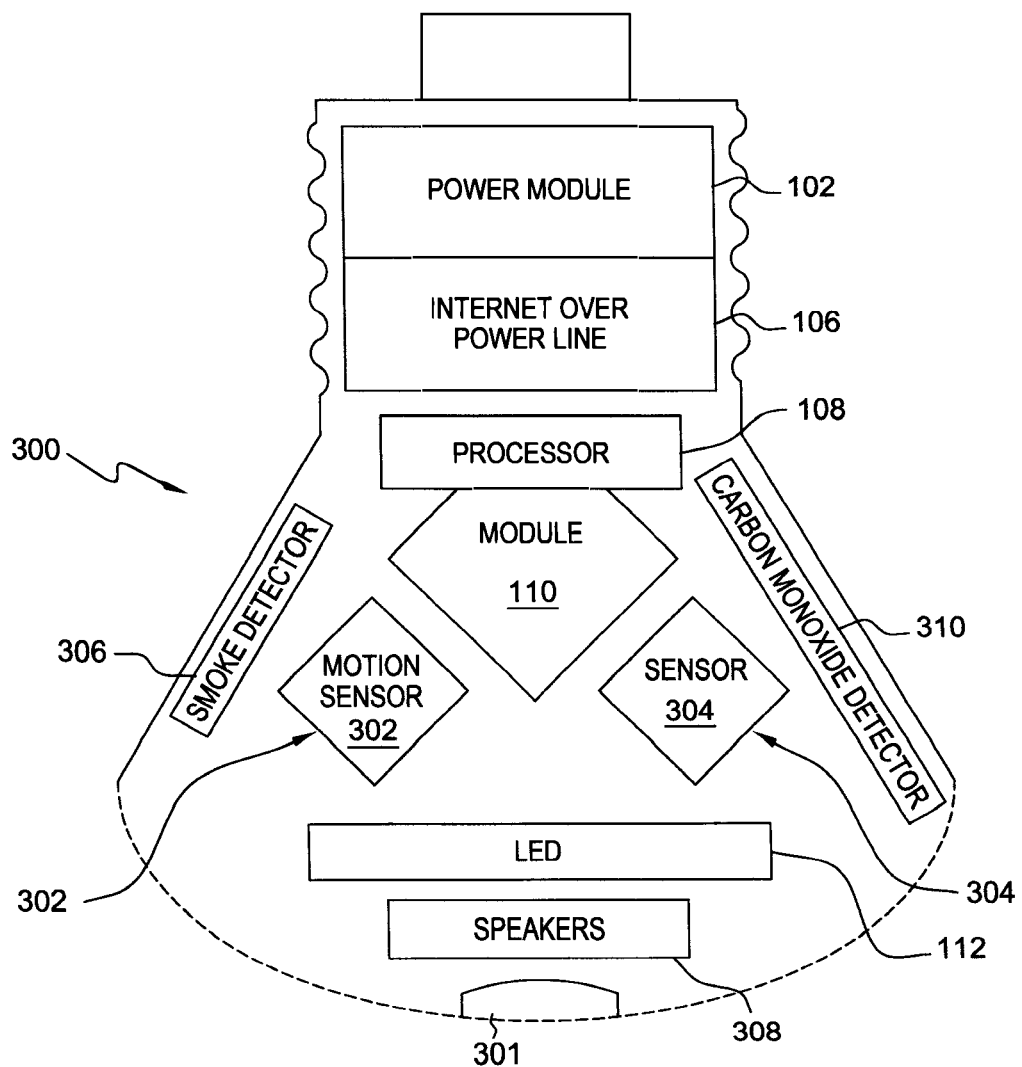
FIG. 3A is a cross-sectional view of an alternative embodiment of the HBS.

In FIG. 3A, an alternative embodiment of the HBS 300 is illustrated in cross-section which may contain a camera(s) 301, light(s) 112, long and short range motion sensor 302, environmental sensors (light, temperature, electrical, wind/airflow, nitrogen biochemical, chemical, sound, particle, proximity) 304, smoke detector 306, speakers 308, and carbon monoxide detector 310. Also, not shown in FIG. 3A, but which may be included are a microphone(s), ultra sound emitter and receiver, and/or a radar(s). Each of these functional elements may be in the form of a detachable module which can be added to or detached from the customizable housing of HBS 300 depending on the application required. The HBS 300 may be used to transmit all the data from the sensors to a user's mobile device via wireless or wired connection. The camera(s) 301 may be used for three dimensional (3D) image mapping and/or infrared sensing. The camera(s) may also be used, for example, to monitor a babysitter. The plurality of environmental sensors may be used for sensing disruption of the environment and then reporting the disturbance through the communication module 110. The communication module 110 may be configured to send customizable, pre-recorded distress signals to an emergency service provider (e.g., 911) upon the detection of a disturbance. The speakers 308 can be used to play music or sound an alarm. Carbon monoxide detector 310 may be used to detect the presence and/or increase of carbon monoxide. Light (e.g., LED) 112 may be turned ON and OFF during the day or night by sensor 304 (e.g., light sensor).

Figure 3B:
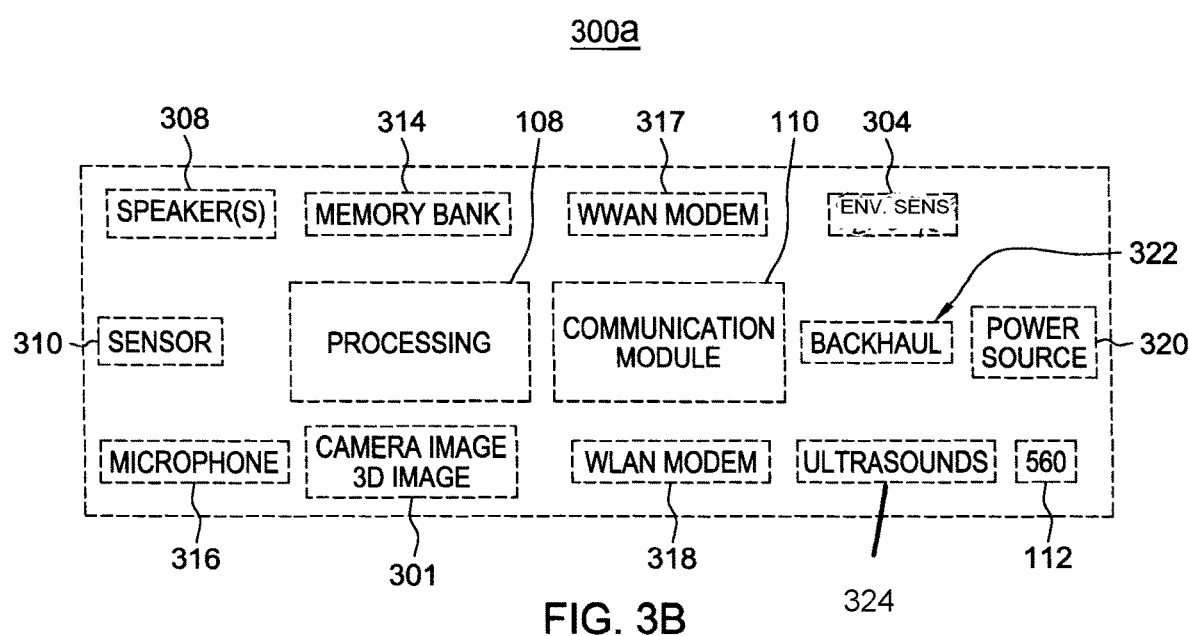
FIG. 3B is a block diagram representation of another alternative embodiment of the HBS of FIG. 1.

FIG. 3B shows an alternative embodiment wherein HBS 300a is shown in a block diagram which may be in a housing similar to that of the HBS 300 or a different type of housing. HBS 300a has similar and additional modules than that of HBS 100 and 300 for enhanced functionalities. Sensor module 310 may be made up any or all of the following type of detachable sensors: fire detection, carbon monoxide, temperature sensor, and/or three-dimensional mapping of a temperature field. Reference numeral 314 is a detachable memory bank for storing information useful to the HBS 300a. Reference item 316 indicates a microphone for detecting sounds in the environment of the HBS. Wireless Wide Area Network (WWAN) Modem 317 may include a baseband, radio frequency integrated circuit (RFIC), radio frequency front end module (RF FEM), and is able to connect to mobile networks through communication standards such as 3G, 4G and 5G. The HBS 300a may also include a Wireless Local Area Network (WLAN) modem 318 to connect through WiFi and Zigbee®. Connections from HBS 300a can be made via Near Field Communications (NFC), Bluetooth®, WHDMI, etc. Item 320 is a power source which can obtain power directly from a power line. In this embodiment, communication (or connectivity processing) module 110 could have multiple radios inside to be used as repeaters. Backhaul 322 could be Ethernet over Power Line. LED (or a plurality of LEDs) 112 again provides a lighting function in this embodiment of the HBS. Sensor 324 performs an ultrasound function such as measuring the distance of an object.

Figure 4:
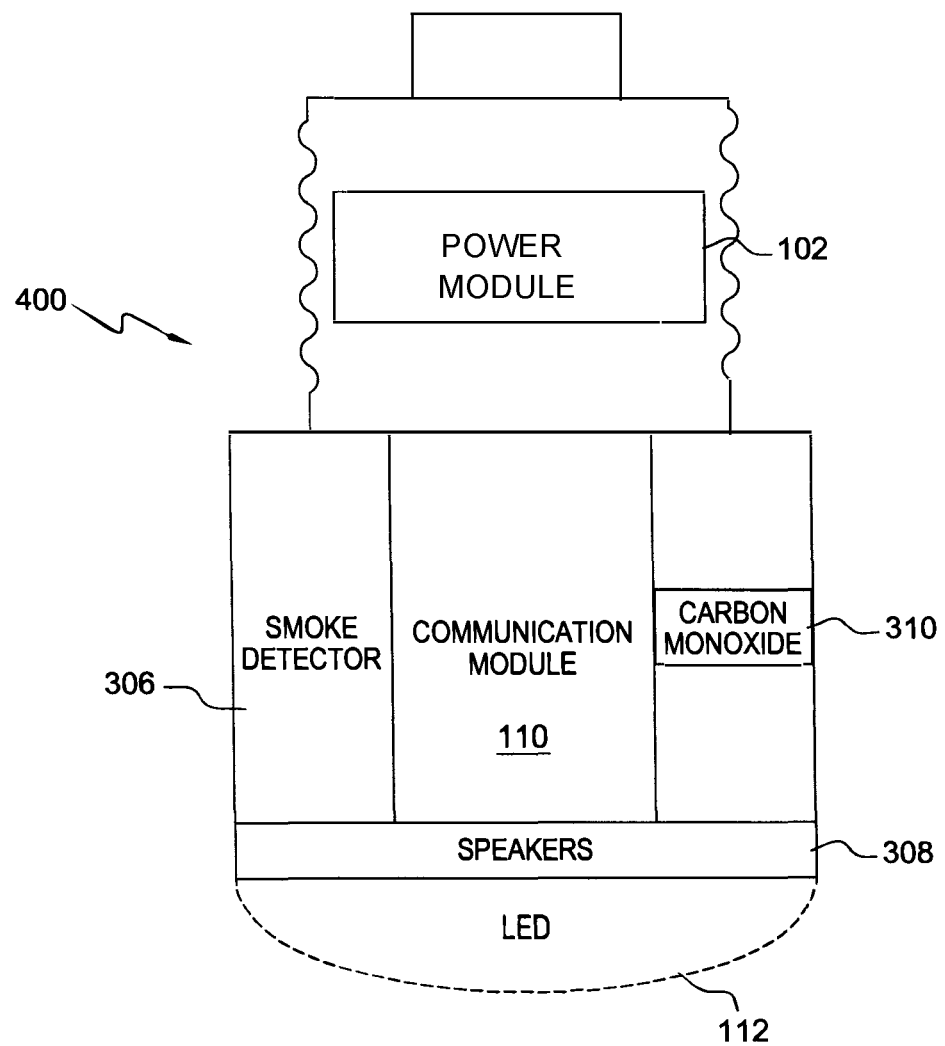
FIG. 4 illustrates a cross-sectional view of a modular version of the HBS.
Figure 5:
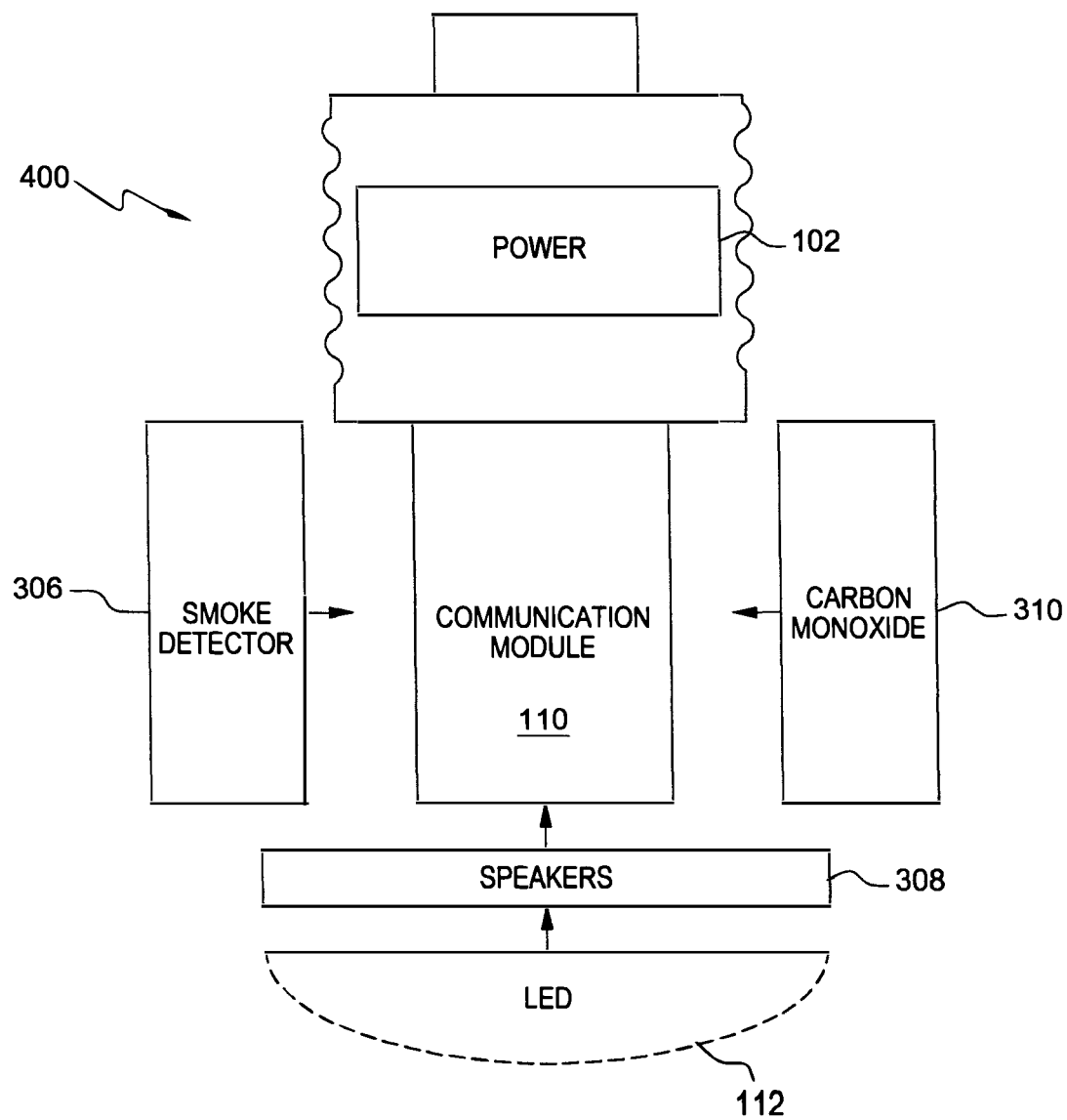
FIG. 5 is a cross-sectional exploded view of FIG. 4.

FIG. 4 shows another modular version of the Handy Base Station (HBS 400) and FIG. 5 is an exploded view of FIG. 4. HBS 400 is customizable and allows users to add or detach all (or substantially all) the functional modules. This modularity decreases the cost of the Handy Base Station and allows for a customizable HBS housing. Each HBS 100, 300, 300a and other HBS's described below may modular with detachable functional modules as shown in FIG. 4.

Figure 6A:
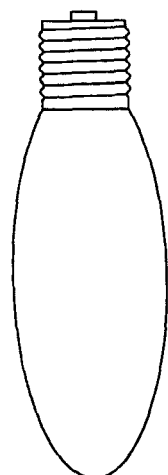
FIGS. 6A-6J illustrate a variety of lamp housings in which the HBS may be contained.
Figure 6B:
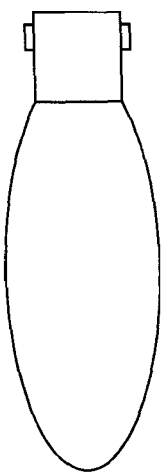
Figure 6C:
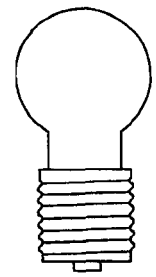
Figure 6D:
Figure 6E:
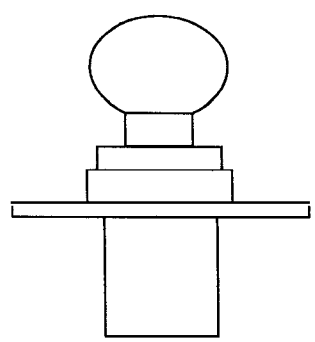
Figure 6F:
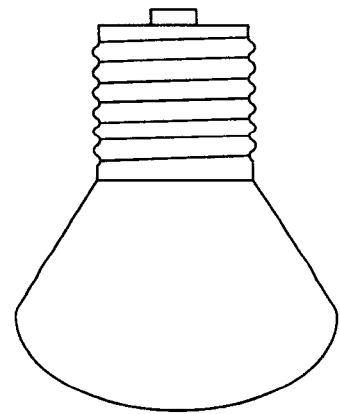
Figure 6G:
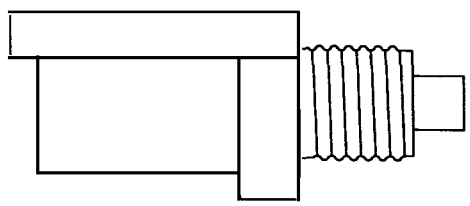
Figure 6H:
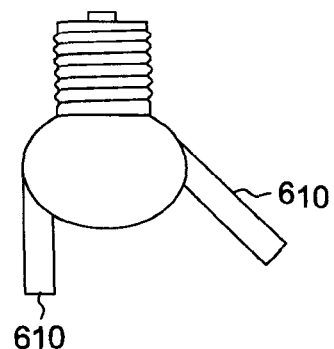
Figure 6I:
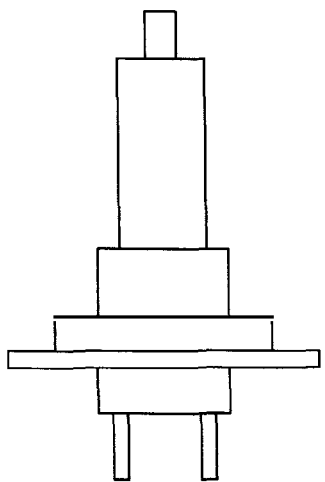
Figure 6J:
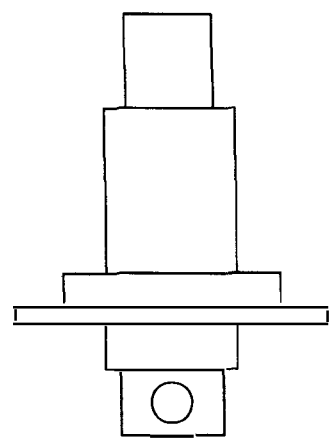

FIGS. 6A-6J discloses a variety of shapes and sizes for the previously disclosed HBS housings 100, 300, 300a and 400. The HBS housing may have an attachment capacity in the form of a screw base or bayonet cap which can easily be connected to standard power sockets of incandescent lamps or sodium lamps which are commonly used as indoor or outdoor electrical lighting. Technical standards for lamp bases which may used as the attachment device for any of the HBS's 100, 300, 300a and/or 400 include ANSI standard C81.67 and IEC standard 60061-1. These are common commercial lamp sizes for easy adaptation to household lamp sockets and street light poles. The car lamp versions of the HBS can include cab base P14.5, PX26d, PGJ23t-1, P22d 90 degrees, or BA20d. Also, the HBS can be located in a brake lamp or headlights lamps for use in a vehicle. FIG. 6H shows antennas 610 protruding from the HBS housing for wireless communication with other wireless devices. In alternative embodiments, these antennas 610 can be located inside the HBS housing. One of the benefits of the HBS is that it can benefit from the large installed base of fixtures to provide a new solution able to operate effectively in an older installed environment.

Figure 7:
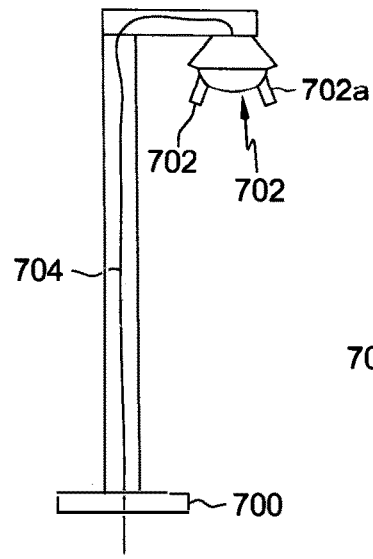
FIG. 7 shows a light pole with an HBS lamp installed in a the fixture.

FIG. 7 illustrates a light post 700 having HBS housing 702 attached which could be one of the HBS embodiments 100, 300, 300a or 400. The HBS housing 702 has an antenna 702a protruding from each side to increase its transmission and reception range. The light post 700 may be located, for example, in a parking lot, a row of street lights, a national park or a house. Reference numeral 704 illustrates the backhaul over power line (e.g., Ethernet over Power Line) which may connect to a network (e.g., Internet) over the main power line. The main power line is also used to power the HBS housing 702. The HBS housing 702 can also contain a backup battery in case the main power goes down. As previously discussed, the HBS housing 702 in this embodiment can function as a macrocell, microcell, picocell, femtocell, distributed antenna system (DAS), WiFi Access Point (AP), wireless backhaul, mm-wave system, microwave system or repeater. For the purposes of this description, a macrocell has a range of greater than 2 kilometers wide or more; microcell has a range of approximately two kilometers wide or less; a picocell has a range of approximately 200 meters or less; and a femtocell has a range of approximately 10 meters or less. As discussed, the mm-wave communications will typically operate in the range of 30 GHz to 300 GHz. Note that the recitation of ranges of values in this disclosure are merely intended to serve as a shorthand method of referring individually to each separate value falling within the range, unless otherwise indicated herein, and each separate value is incorporated into the specification as if it were individually recited herein. Therefore, any given numerical range shall include whole and fractions of numbers within the range. For example, the range "1 to 10" shall be interpreted to specifically include whole numbers between 1 and 10 (e.g., 1, 2, 3, . . . 9) and non-whole numbers (e.g., 1.1, 1.2, . . . 1.9). When in the same way that repeaters are an auxiliary wireless base station for a given network, when an HBS 702 (or HBS 100, 300, 300a and 400) is an Access Point it also provides wireless connectivity that you want in that particular part of your network. However, instead of repeating signal. These HBS's 702 may take a direct feed from the router straight into the back of the Access Point itself.

Figure 8A:
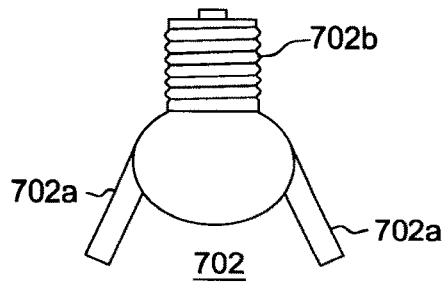
FIGS. 8A-8B show HBS lamps that may be installed in the light pole of FIG. 7.
Figure 8B:
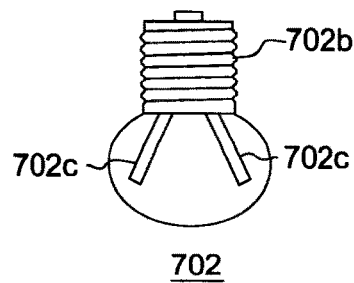

FIG. 8A shows an HBS housing 702 which can be used in the light post 700. It has a light bulb socket connector 702b in addition to the external antennas 702a. The HBS housing 702 may contain a light with light sensor as previously described. FIG. 8B shows an alternative embodiment of the HBS housing 702 in which antennas 702c are embedded inside the HBS 702. As previously discussed, the HBS housing 702 may include a camera for monitoring, 3D imaging mapping, weather sensor, fire sensing, and/or carbon monoxide sensing as discussed with regard to HBS 100, 300, 300a and/or 400.

Figure 9:
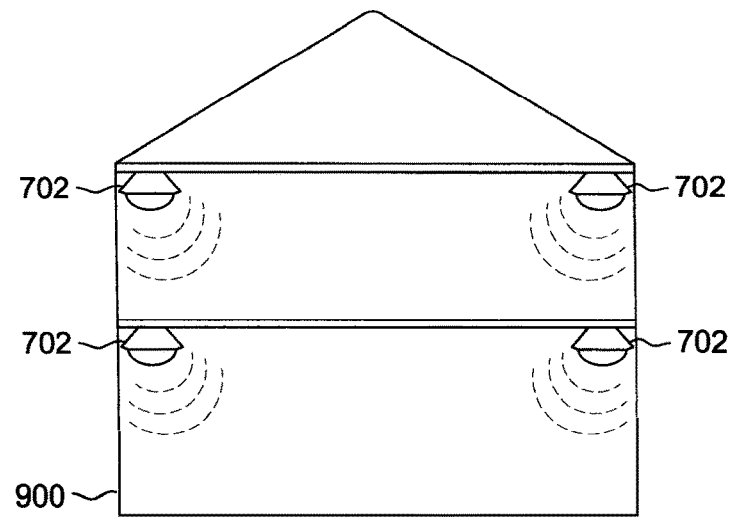
FIGS. 9 and 10 illustrate a plurality of HBS's in operation inside a building.
Figure 10:
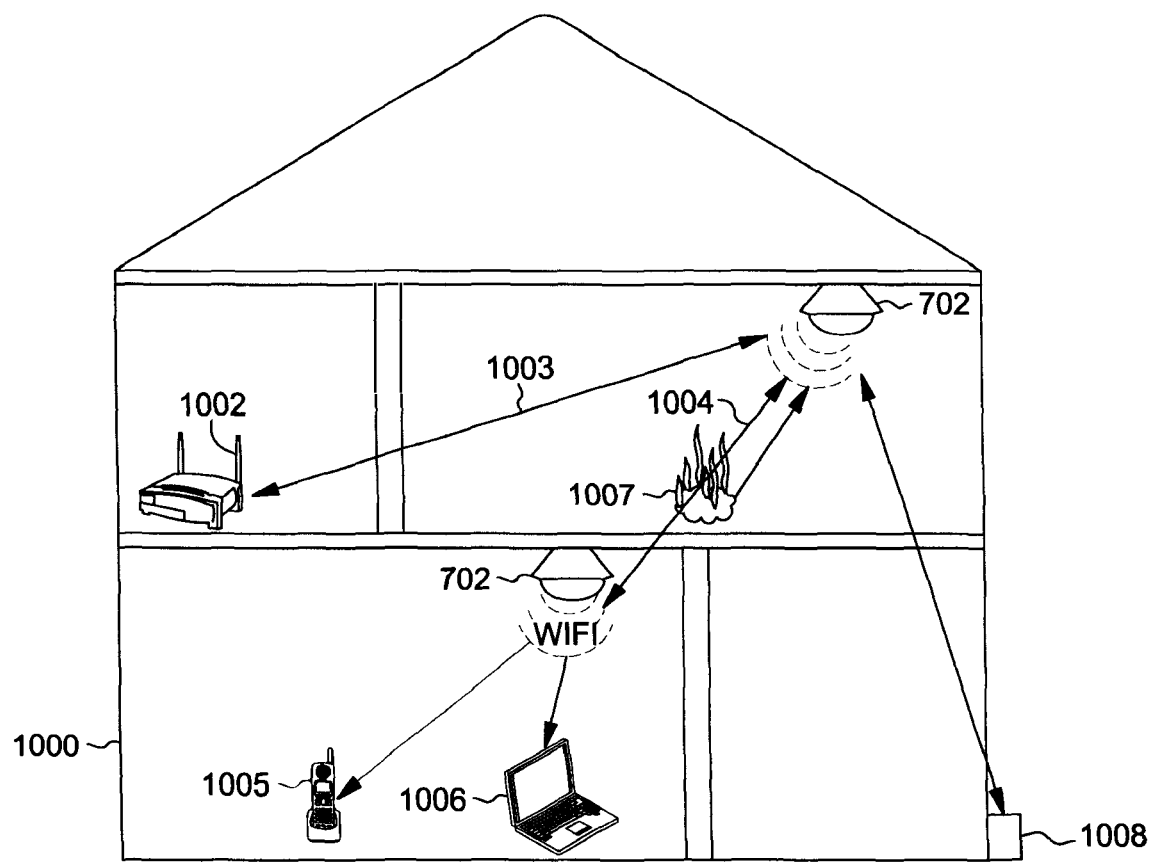

FIG. 9 shows a plurality of HBS's 702 operating inside a building 900. Ideally, these embodiments of the HBS's may include fire sensors, carbon monoxide sensors, cameras, wireless connectivity and automatic warning signals. They also could be used for 3D image mapping to import AutoCAD or other similar software. FIG. 10 illustrates a building 1000 such as a personal residence having at least two HBS's 702. Access Point (AP) or small cell 1002 is in wireless communication 1003 with an HBS 702 using communication standards WiFi, WiFi Direct, 3G, 4G, mm-wave, microwave, etc. The HBS's 702 are also in wireless communication 1004 with each other also using WiFi, WiFi Direct, 3G, 4G, mm-wave, microwave, etc. Personal devices such as phone or tablet 1005 and computer 1006 may connect wirelessly (e.g., WiFi, WiFi Direct, Bluetooth) with the HBS's as shown in FIG. 10. In the event of a fire 1007, an HBS 702 is capable of sensing the smoke, heat and/or carbon monoxide and send a signal to a main power switch 1008 to shut off power to the building 1000 and send a distress notification to a central location.

Figure 11:
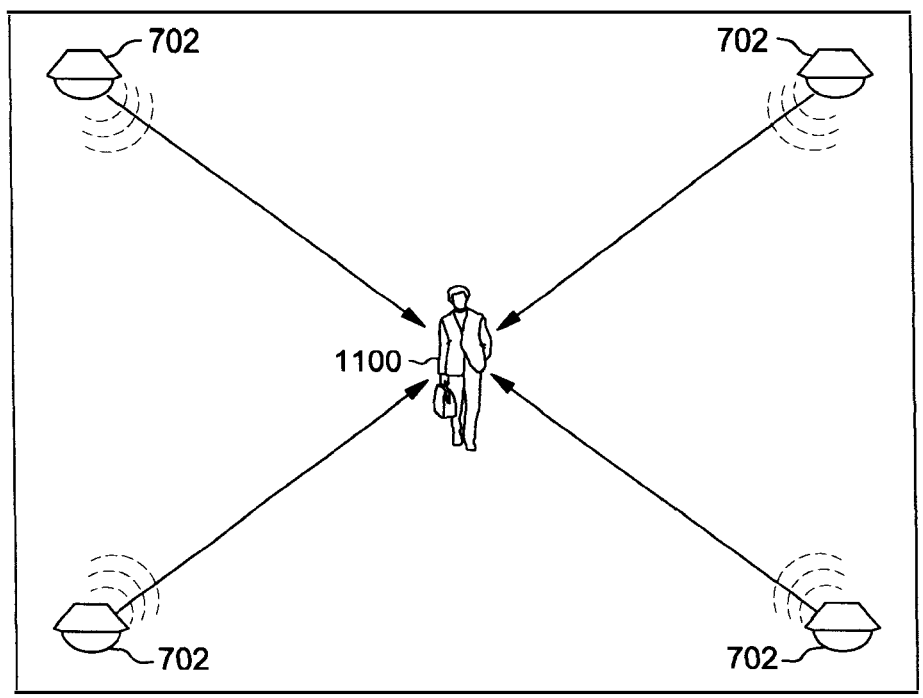
FIG. 11 shows a plurality of HBS's being used to locate a person's position in a building.

FIG. 11 shows a plurality of HBS's 702 being used to determine a person's mobile device (e.g., phone, tablet, smartwatch, etc.) 1100 position in a building using the person's phone IP or wireless mac address and/or mobile equipment identifier (MEID) or similar ID and comparing between the plurality of detected locations to arrive at the approximate coordinates of the mobile device 1100. Although shown inside, the HBS's might also perform the same function in an outside location.

Figure 12A:
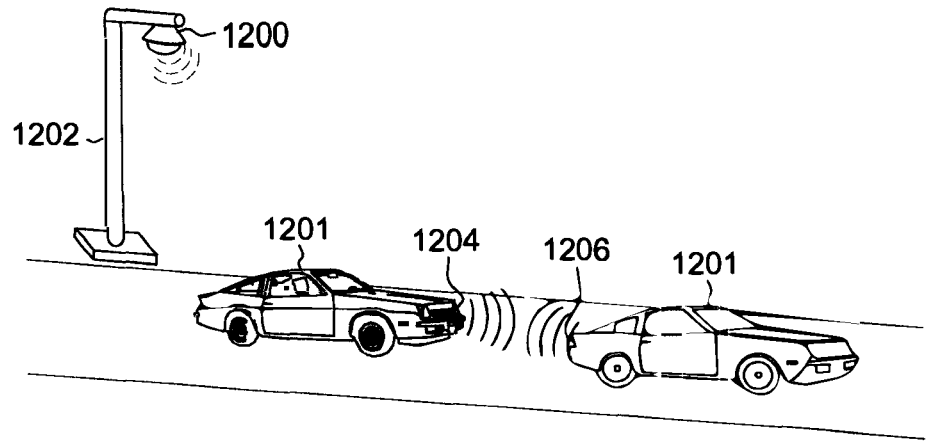
FIGS. 12A and 12B show HBS's in operation with vehicles.
Figure 12B:
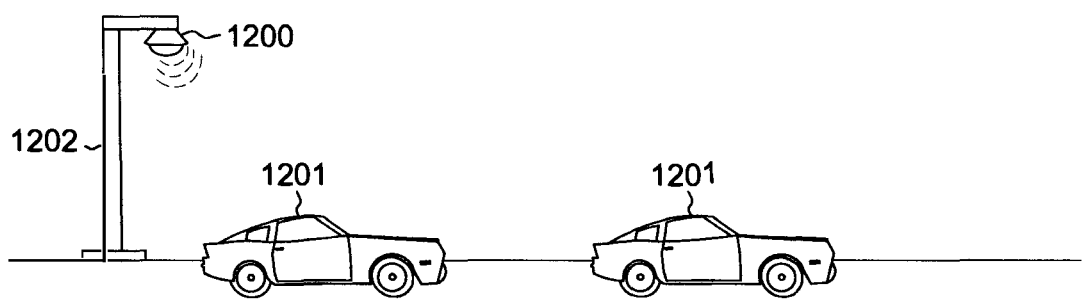

The HBS housings 100, 300, 300a, 400, and/or 702 can also be installed into or on vehicles to make them smarter and help drivers avoid accidents. FIG. 12A shows an HBS 1200 mounted in a light pole power source/Ethernet connection 1202 which can detect the presence of vehicles 1201 and car accidents and warn other vehicles and emergency response authorities of accidents. In this embodiment vehicle 1201 may have remote wireless terminals. "Remote wireless terminal" as used herein may be device that is capable of transmitting and receiving data by wireless communication methods, e.g., by ZigBee®, Bluetooth@, WiFi, 2G (e.g., Global System for Mobile Communications (GSM)), 3G (e.g., Code Division Multiple Access (CDMA), Wideband CDMA (WCDMA), Time Division Synchronous CDMA (TD-SCOMA)), WiMax, 4G LTE, and/or 5G cellular communication standards. The HBS 1200 may be an embodiment with a camera located therein and can detect an accident in that manner. In an alternative embodiment, the HBS 1200 may receive wireless signals from HBS's 1204, 1206 installed in the light ports of the vehicles 1201. The wireless signals may be used for either normal communications and/or may be used to alert the HBS 1200 that an accident has taken place. HBS's 1204 and 1206 may also signal to the drivers of the vehicles 1201 that they are too close to each other for safety and that an accident may happen as a result. The HBS's 1204, 1206 can be installed in the front, back or side of the vehicles 1201 or in a plurality of locations on the inside or outside of the vehicle 1201. HBS's 1200, 1204, and/or 1206 may signal other HBS housings in their mesh network that an accident has occurred. The power module 102 shown in HBS 100 and/or 300 may be present in HBS's 1204, 1206 and may be configured to provide electricity generated from kinetic energy of the movement of the vehicle (e.g., acceleration and deceleration of the vehicle, hitting bumps in the road) to other modules in the HBS's 1204, 1206. Also, power module 102 may be present in HBS 1200 which is mounted on the light pole and may be configured to provide electricity generated from kinetic energy of the swaying movement of the light pole to other modules in the HBS 1200. FIG. 12B shows the HBS 1200 on a light pole 1202 assisting in the parking of vehicles 1201. The HBS 1200 sends signals to vehicle driver's interface device (e.g., display screen) in the vehicle and/or mobile device in the vehicle (e.g., phone, tablet, smartwatch, etc.) with a speaker or LED indicator to stop or slow down. The signals can be sent via wireless communication or over a wired connection in pole 1202 to ultimately be sent wirelessly to the vehicle 1201. HBS 1200 may detect that other vehicles are using radar, laser, camera, or other wireless systems and signal as such the vehicles 1201.

Figure 13:
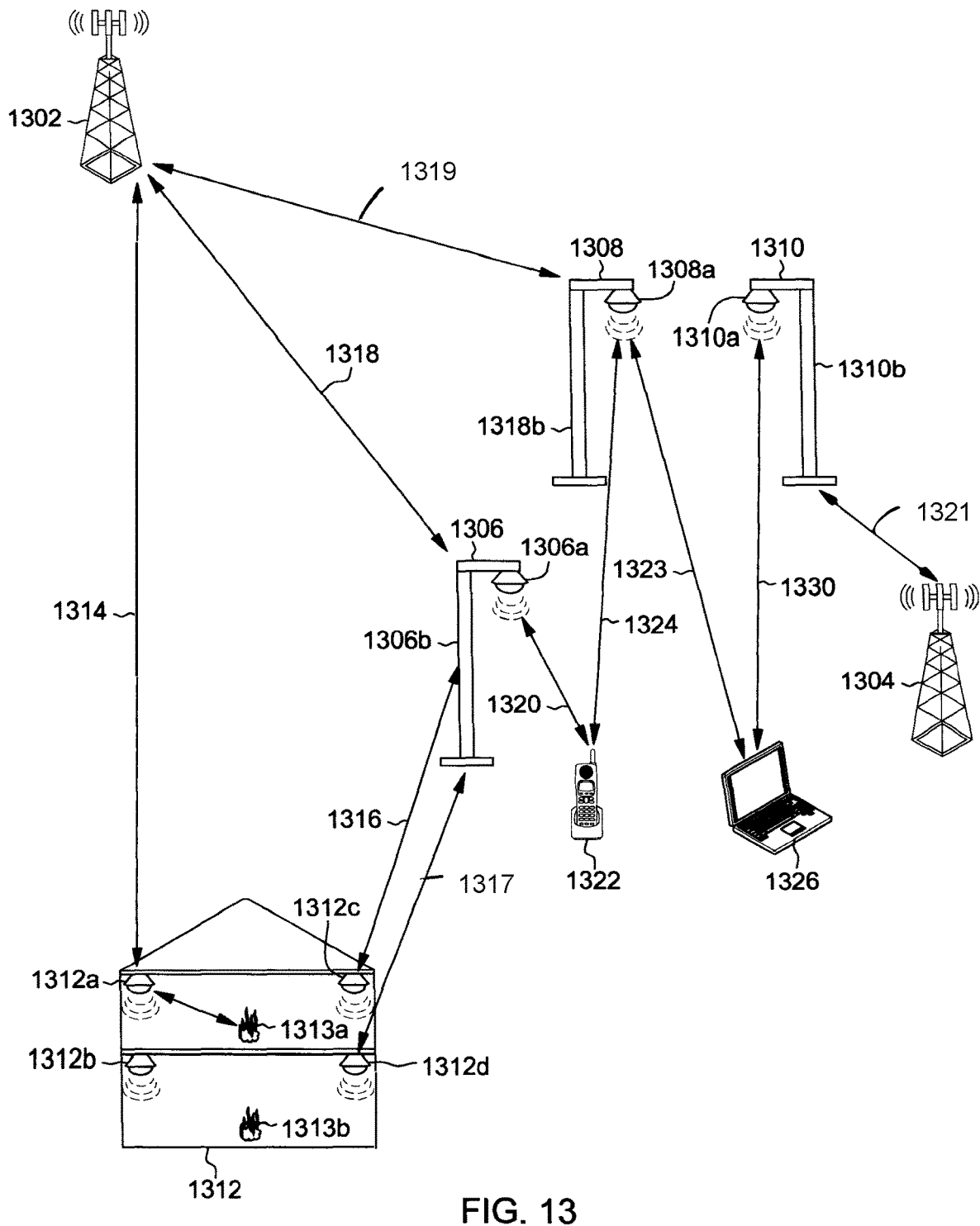
FIG. 13 illustrates a system in which a plurality of HBS's operate at different wireless standards and frequencies.

FIG. 13 demonstrates an environment in which a plurality of HBS's 100, 300, 300a, 400, 702, and 1200 can operate at different standards (e.g., WiFi, 3G, LTE, mm-wave, microwave, etc.) and frequencies (e.g., 700 MHz to 3.5 GHz). Large base stations 1302 and 1304 are typically where the wireless antenna and network communications are placed. These base stations 1302 and 1304 usually include a transmitter/receiver, antenna tower, and radio controllers for maintaining communications with mobile devices within a given range. Base stations 1302 and 1304 are in communication with a plurality of poles 1306, 1308 and 1310 having corresponding HBS's 1306a, 1308a, and 1310a. The communication links 1318 and/or 1319 may be wired communications such as through Ethernet over Power Line or a wireless communications using standards previously discussed with regard to the HBS's such as 3G, 4G, 5G, microwave, WiMax, and/or mm-wave. Pole 1306 also includes a power line 1306b which allows for communication to a building 1312 from HBS 1306a through a wired connection 1317 such as an Ethernet over Power Line (as previously discussed) or wirelessly 1316. Pole 1310 includes power line 1310b which allows for a communication link 1321 with the base station 1304 using Ethernet over Power Line, wireless or the like. Building 1312 contains HBS's 1312a, 1312b, 1312c and 1312d. Each of these HBS's may communicate with the base stations 1302 and 1304 in different ways. For example, in case of a fire in building 1312, the HBS's 1312a and 1312b detect fire 1313. HBS 1312a communicates the fire information wirelessly 1314 to base station 1302. HBS 1312b communicates the fire information wirelessly 1316 to HBS 1306a which then relays the information wirelessly at approximately 3.5 GHz to base station 1302. Simultaneously, another fire 1313 is detected on the bottom floor of building 1312 by HBS's 1312d which communicates through link 1317 that fact by the Internet through power line 1306b (e.g., using Ethernet over Power Line) with HBS 1306a. HBS 1306a relays it to base station 1302 as previously described. HBS 1306a can also receive and transmit wireless communications 1320 at approximately 1.9 GHz from and to a mobile device 1322. Mobile device 1322 can communicate through wireless link 1324 over WiFi with HBS 1308a. Portable computer 1326 may also communicate with HBS 1308a through wireless link 1323 at a frequency of approximately 900 MHz and with HBS 1310a wirelessly 1330 at approximately 1.7 GHz.

Figure 14:
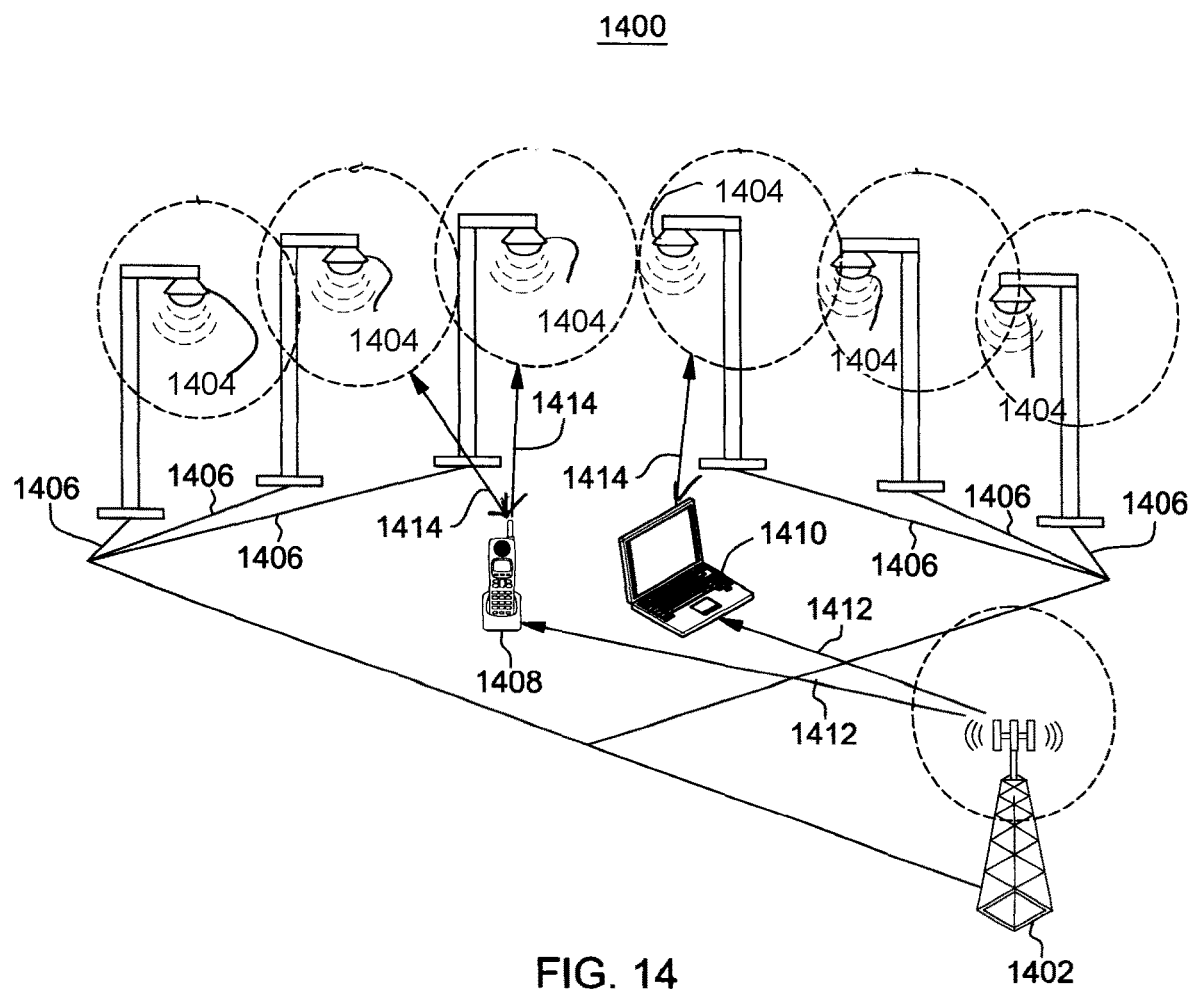
FIG. 14 illustrates a mesh network or giant antenna array application of HBS's.

FIG. 14 illustrates a mesh network or giant antenna array application 1400 for backhaul. In this embodiment, a base station 1402 is connected over the Internet to a plurality of power poles each having an HBS 1404 through power lines 1406 or a high speed line (e.g., fiberoptic). Mobile device 1408 and computer 1412 each receive an approximately 800 MHz downlink 1414 from base station 1402 and communicate with HBS's 1404 on the poles through approximately 3.6 GHz uplinks.

Figure 15:
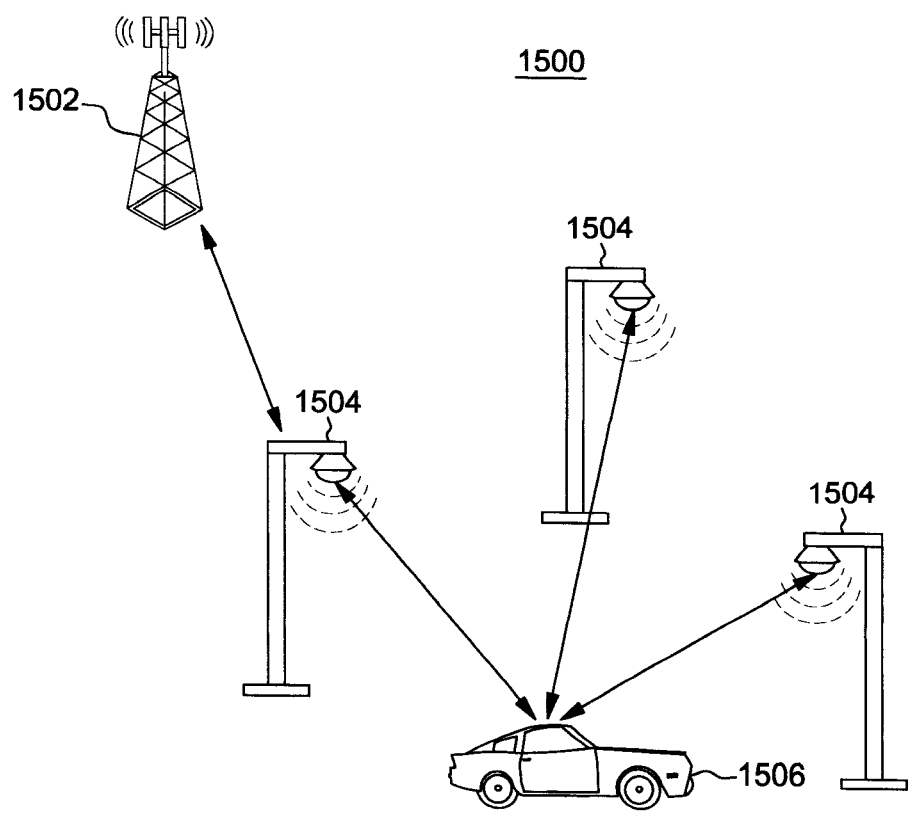
FIG. 15 illustrates a system in which the HBS's use onboard sensors to locate an object position and map the three-dimensional characteristics of the object such as a vehicle.

FIG. 15 shows another mesh network or giant antenna array application 1500 for backhaul. In this embodiment, a base station 1502 is connected wirelessly to a plurality of power poles each having an HBS 1504. Each HBS 1504 uses onboard sensors such as cameras, ultrasounds, microphones to locate an object (e.g., vehicle) 1506 position and map the characteristics (e.g., 3D characteristics) of the object 1506. For example, this system may be used to track package deliveries. The object 1506 position may be triangulated with ultra sound or cameras. In addition, HBS's 1504 may have sound detection equipment to find the location of sounds like gun fire and forward the location information to the appropriate authorities.

Figure 16A:
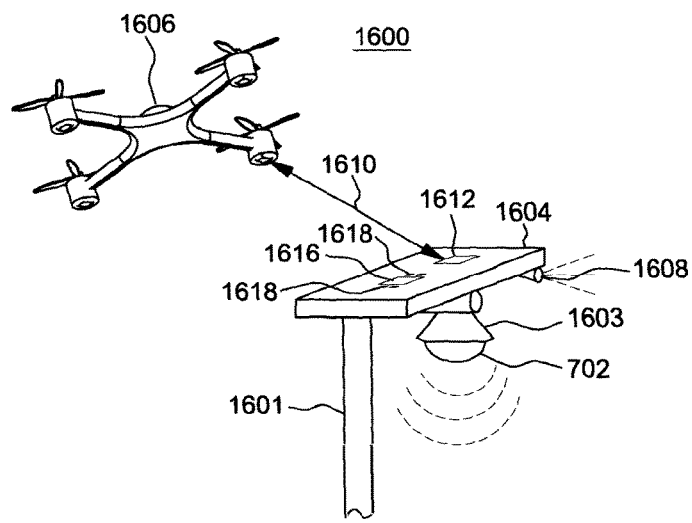
FIGS. 16A-16J disclose an HBS system which may be used to control and charge Unmanned Aerial Vehicles (UAVs).

FIG. 16A shows a combination unit or system 1600 which has an HBS 702 with any or all of the components and functionalities of the previously described HBS's (including HBS 100, 300, 300a, and/or 400) in a housing 1603 mounted on a utility pole 1601 with a landing pad 1604 attached for an unmanned aerial vehicle (UAV) or drone 1606. The utility pole 1601 is typically a light pole but it could also be a telephone poll or some other type of pole. The UAV 1606 may contain a remote wireless terminal (e.g., an HBS). Alternatively, the fixture on the pole 1601 can be just a standard lighting fixture containing an incandescent, fluorescent, low pressure sodium, high intensity discharge or LED lamp without an HBS 702. In this alternative embodiment, the landing pad 1604 may have a beacon (or communication device) 1608 attached which has the same components and performs the same communication functions of an HBS (i.e., HBS 100, 300, 300a, 400 and/or 702) as discussed above and below in this description. The beacon 1608 may be detachable. Also, the pad 1604 with the HBS 702 (or beacon 1608) may be mounted inside a building, in a building or on any high spot. The pole 1601 is usually in a height range of approximately 20 to 100 feet tall with the average poll being approximately 35 feet to give the UAV clearance for landing and takeoff. The landing pad 1604 may be made of a solid, light weight material. In alternative embodiments, the landing pad might be made of a metal or plastic mesh or periodically have a plurality of drain hole perforations or channels to avoid harm due to inclement weather such as rain, snow or ice. In other alternative embodiments, the landing pad may be also be mounted at a slant to drain off rain or melting snow or ice. HBS 702 may have alight sensor which controls when to turn the light ON and OFF for night or day time but will keep the HBS 702 and its wireless communications always on. The landing pad 1604 provides a charging, parking and resting station or pad where a UAV 1606 can stop and recharge. For example, a UAV delivering groceries may use the frequently located HBS's as a navigational guide, communication links, and or resting/recharging spot. The landing pad 1604 may have its charging functions controlled by an HBS 702 (i.e., typically a module inside HBS 702). Another feature that may be integrated into the HBS 702 is a UAV landing module. The UAV landing module may contain navigation and wireless communication functions or, alternatively, the UAV landing module might be coupled to a separate navigation module and wireless communication module.

Figure 16B:
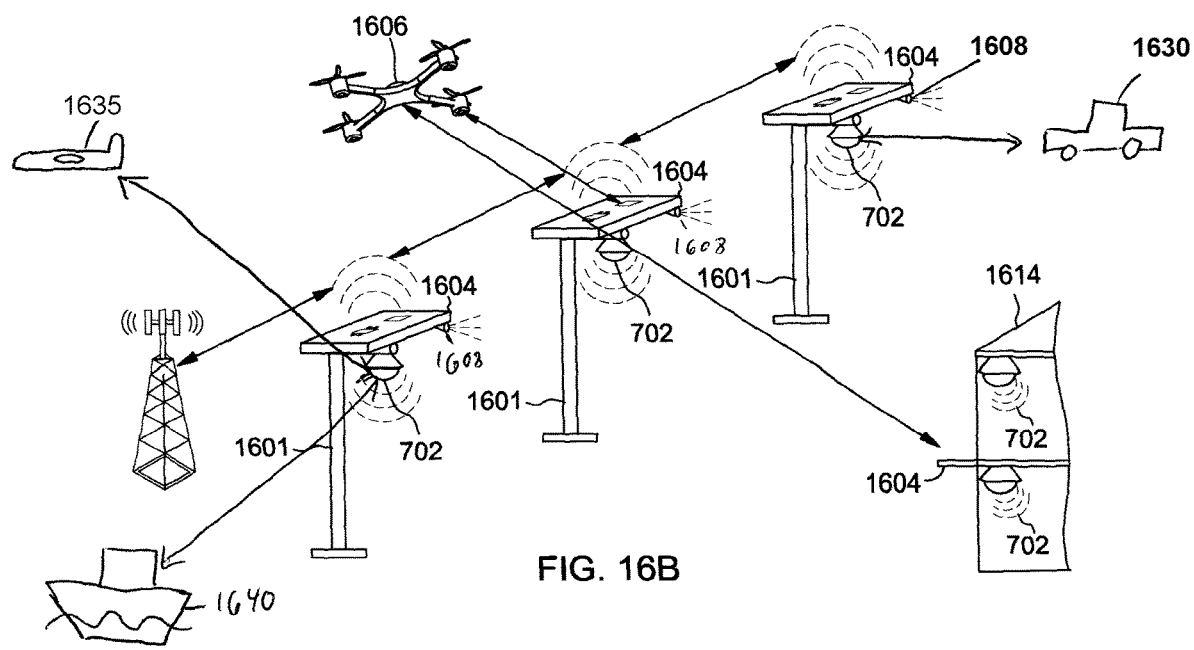

FIG. 16B shows a system of combination poles 1601 having HBS's 702 which together can be used to control by radio signals the UAV 1606 so that the UAV does not lose control contact and communication. The control communication can be on any frequency (e.g., 400 MHz to 6 GHz). FIG. 16B further illustrates a landing pad 1604 attached to the side of a building 1614 and the UAV 1606 being controlled by HBS's 702 located inside (or exterior to) the building 1614. Communication between an HBS 702 and a UAV 1606 might include communications of sensor data, image data, video data and UAV control and command data. The communication relationship between an HBS 702 mounted on or in a pole, building, hilltop or similarly situation spot and a UAV can also be implemented between an HBS and a land-based (e.g., automotive) vehicle 1630, a manned aerial vehicle 1635 and/or a marine vessel 1640. The HBS(s) 702 may conduct communications with all four types of these moving objects simultaneously depending on the type of communication modules integrated into the HBS 702. The objects 1606, 1630, 1635 and 1640 each may have a remote wireless terminal(s) (e.g., HBS(s)) mounted on the outside and/or inside or might use standard communications gear. Correspondingly, poles 1601 may just have standard communications gear and be in communication with the 4 types of objects 1606, 1630, 1635 and/or 1640 which have an HBS 702 mounted in or thereon. The communication between the HBS(s) 702 and these 4 types of objects (UAV, manned aerial vehicle, land based vehicle, and/or marine vessel) may occur while they are stationary or in motion. A network of HBS's 702 can relay high rate data such as sensor, image and/or video data to and from the 4 types of objects to cloud servers or vehicles/traffic control centers.

Figure 16C:
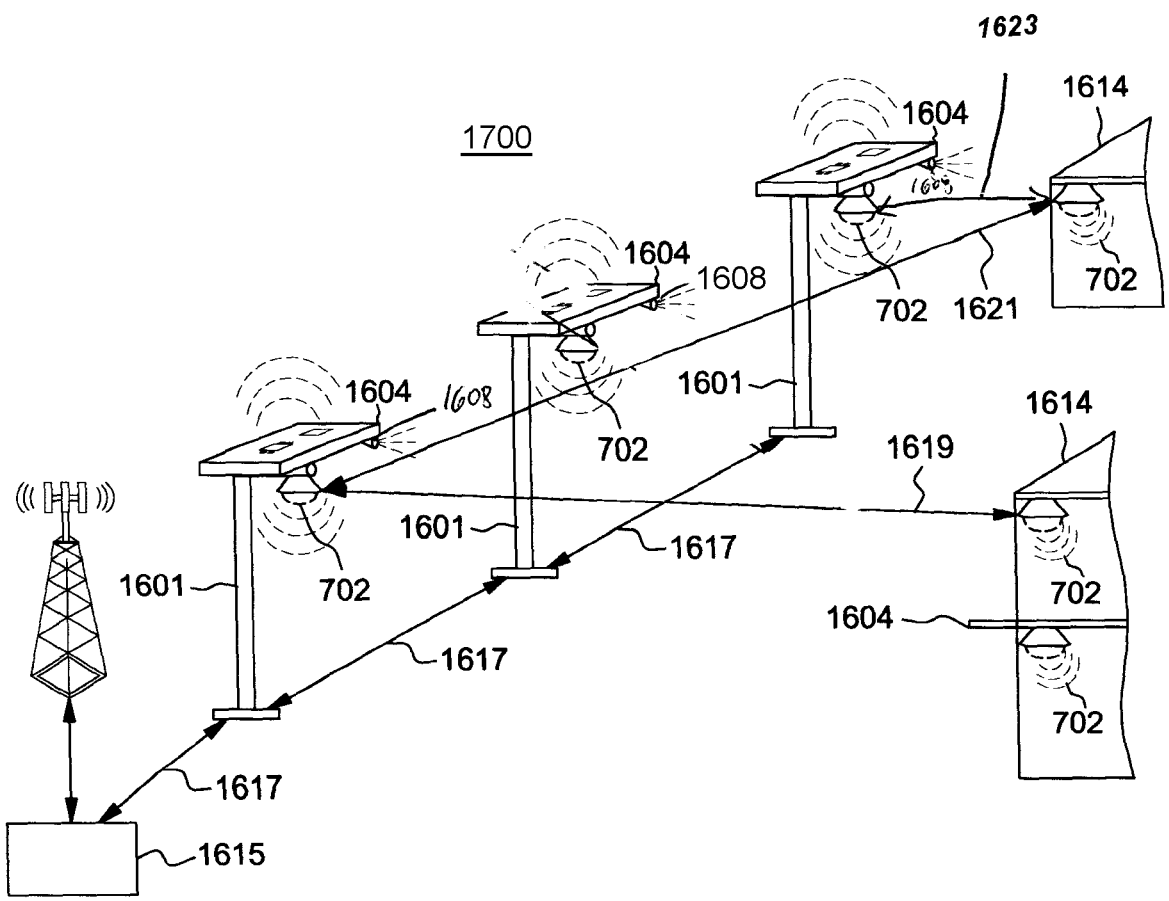
Figure 16D:
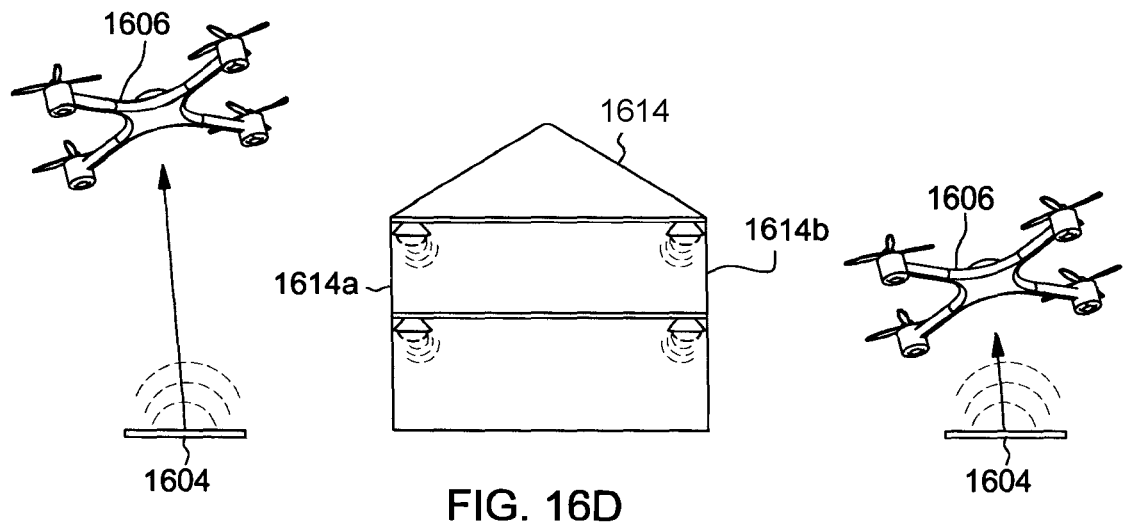
Figure 16E:
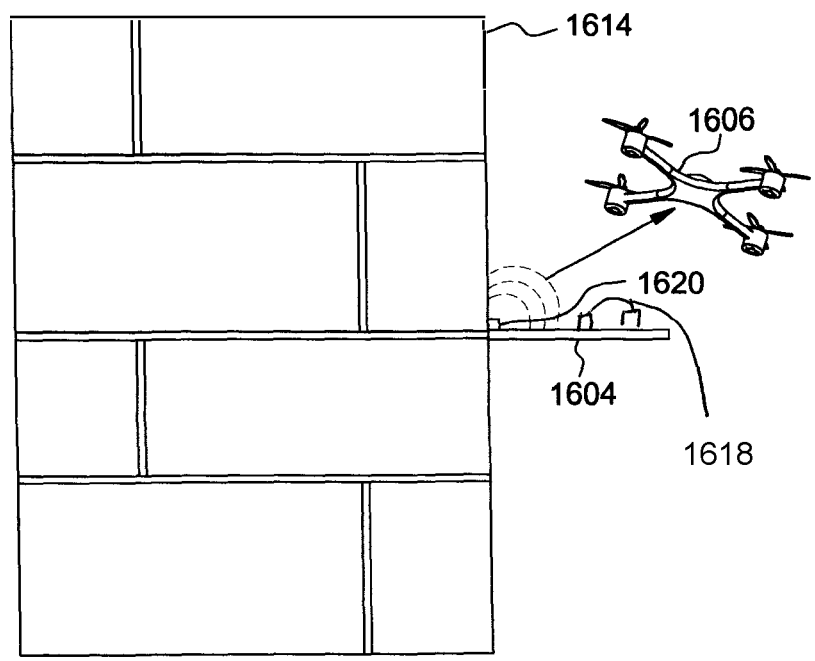

FIG. 16C shows a system 1700 of poles 1601 each connected to a fiber optic or other high speed network 1617 (e.g., Ethernet, coaxial, backhaul, Internet) which is connected to a node 1615 which is connected to a base station 1620. Node 1615 may be a communication data center functioning as an Internet Service Provider Network 1617 or can be a backhaul communication line or a combination power/backhaul communication line (e.g., Ethernet over Power). The HBS's 702 are in wireless communication 1619 and 1621 with the HBS's located in the buildings 1614. The HBS's may communicate through links 1619 and 1621 in a plurality of wireless standards as previously discussed (e.g., mm-wave, microwave, approximately 60 GHz). Links 1619 and 1621 are capable of carrying data intense communications such as movies, etc. [0052] FIGS. 16D and 16E discloses landings locations for the UAV 1606 in more detail. Building 1614 may be a large commercial location or a small residential dwelling. It has landing pads in the front side (1614a) and back side (1614b) of the building. The back side of the building 1614b will possibly provide more security for valuable deliveries. Each of the landings pads 1604 could provide beacon signals through a communication module to the UAVs 1606 to direct them where to land. The landing pads 1604 are further configured to wirelessly send messages to the owner/occupant of the building that the package was delivered by the UAV 1606. FIG. 16E shows an alternative embodiment in which the building 1614 has the landing pad 1604 mounted several floors above the street. The landing pads 1604 may be designed to electronically provide payment for goods upon delivery by the UAV 1606. The landing pads 1604 can used to receive samples that can be tried by the prospective customer and then returned if not satisfied.

As discussed above, the landing pad 1604 can contain a charging mechanism 1616 to recharge a UAV 1606. In alternative embodiments, the landing pads 1604 may be equipped with magnets, clamps or some other type of mounting device (shown as 1620 in FIG. 16E) for attaching the landing pads to the side of the building 1614. Also, the landing pad 1604 may include magnets (or other mechanical devices such as clamps) 1618 on the landing pad 1616 to keep a UAV 1606 in a charging position or from dipping over or being blown off the landing pad 1604 by the wind.

Figure 16F:
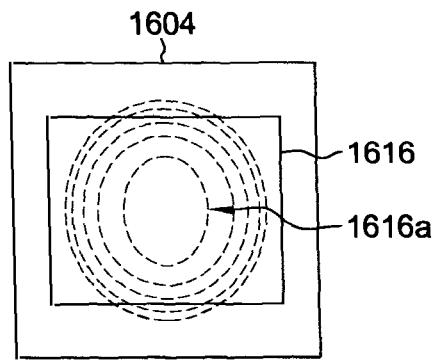
Figure 16G:
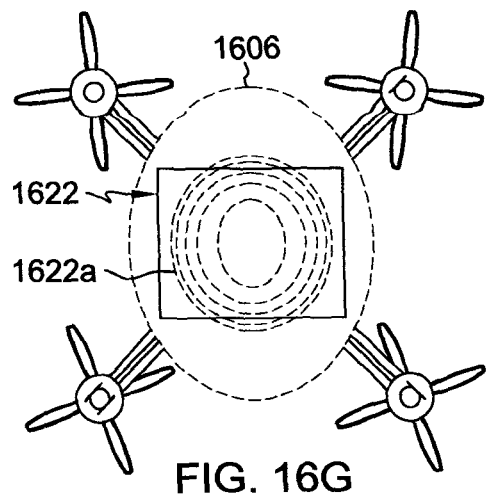
Figure 16H:
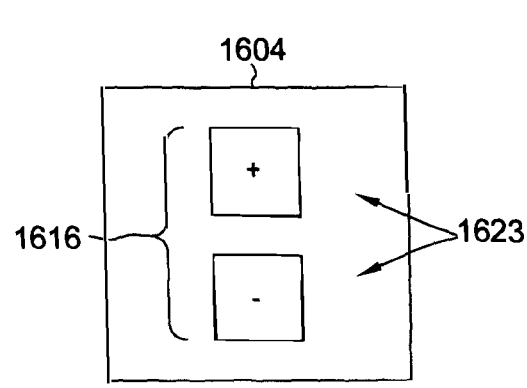
Figure 16I:
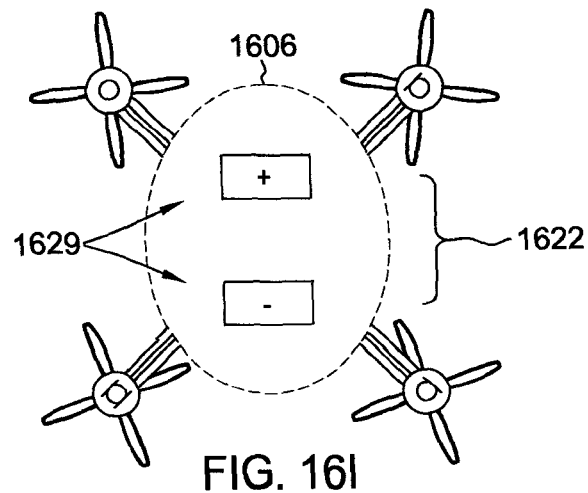

FIG. 16F is a close up of the landing pad 1604 showing the charging mechanism 1616 which can be a wireless or direct metal contact that is integrated into the landing pad 1604. For example, the charging mechanism can be wires such as a transmission coil 1616a. Energy is transmitted from the transmission wires (e.g., coil) 1616a to a UAV 1606 having a corresponding charging mechanism 1622 (e.g., receiving coil 1622a) by electromagnetic induction as shown in FIG. 16G. FIG. 16H is a close up of the landing pad 1604 showing the charging mechanism 1616 which can be a pair of direct metal contacts 1623 that are integrated into the landing pad 1604. FIG. 16I illustrates a corresponding charging mechanism 1622 on the drone 1606 which is also includes a pair of metal contacts 1624.

Figure 16J:
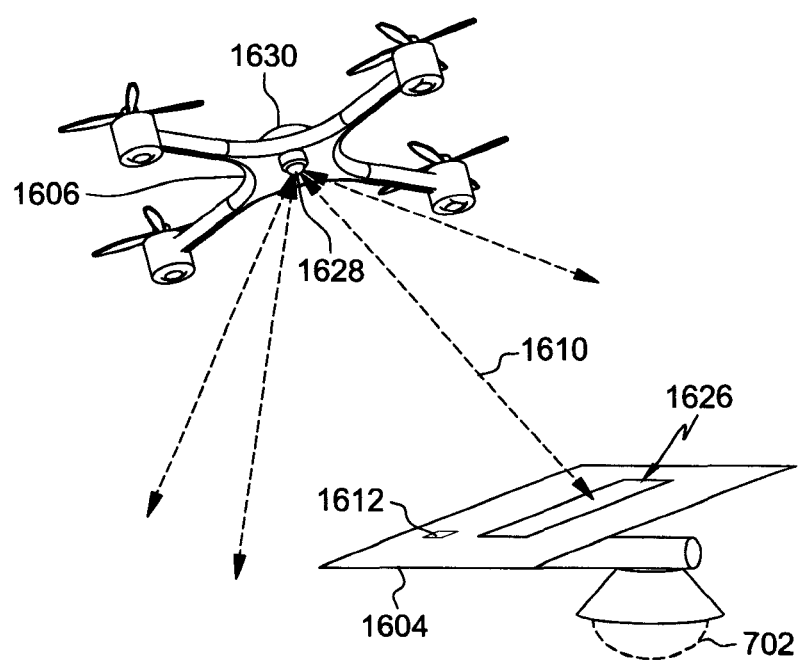

The drone 1606 can use many techniques to land on the landing pad 1604. FIG. 16J shows a laser beam 1610 (e.g., infrared laser) which guides the UAV 1606 to the landing pad 1604. When using laser guided landing, the landing navigation can be done by a reflective surface (e.g., reflective tape) 1626 on the landing pad 1604. The laser may be pulsed or modulated (modulated laser gives better accuracy and range). The drone 1606 can carry a laser transceiver 1628 on a rotating turret 1630 so that it can scan the area for the landing pads. After the laser signal is transmitted it reflects back to the drone 1606 from the reflective surface 1626 and the distance is automatically calculated by processors in the drone 1606. Alternatively, the location of the landing pad 1604 may be a previously mapped and programmed GPS location in the drones 1606 memory. The drone 1606 can have cameras that can be used to scan the area and compare to the map data base such as Google® street view, Bing® data base, Mapquest®, or similar image database. This information is compared to the landing maps and the destination requests that are stored in the cloud or the drone memory. This allows the drone to decide whether to land or not. Also, as previously discussed, the UAV 1606 may use short range communication with the landing pad 1604 in which the landing pad has the built in wireless transceiver 1612 that allows it to communicate with the drone 1606 and the drone's headquarters.

As the new 5G wireless mobile and fixed standards keep pushing the operating frequencies into the millimeter wave (mmWave) spectrum (i.e., about 20 GHz to 300 GHz such as, for example, about 24 GHz, 28 GHz, 40 GHz, 60 GHz, 70 GHz, and/or 100 GHz) and microwave spectrums (i.e., about 0.6 GHz to 20 GHz) it becomes harder and harder to transmit signals through buildings, houses, cars and other objects or obstacles. These challenges limit the range and usability of mmWave and microwave signals and make it more costly in deployment as more mmWave/microwave base stations are needed for the signal coverage. The disclosed embodiments make mmWave and/or microwave signal penetration of buildings possible.

Figure 17:
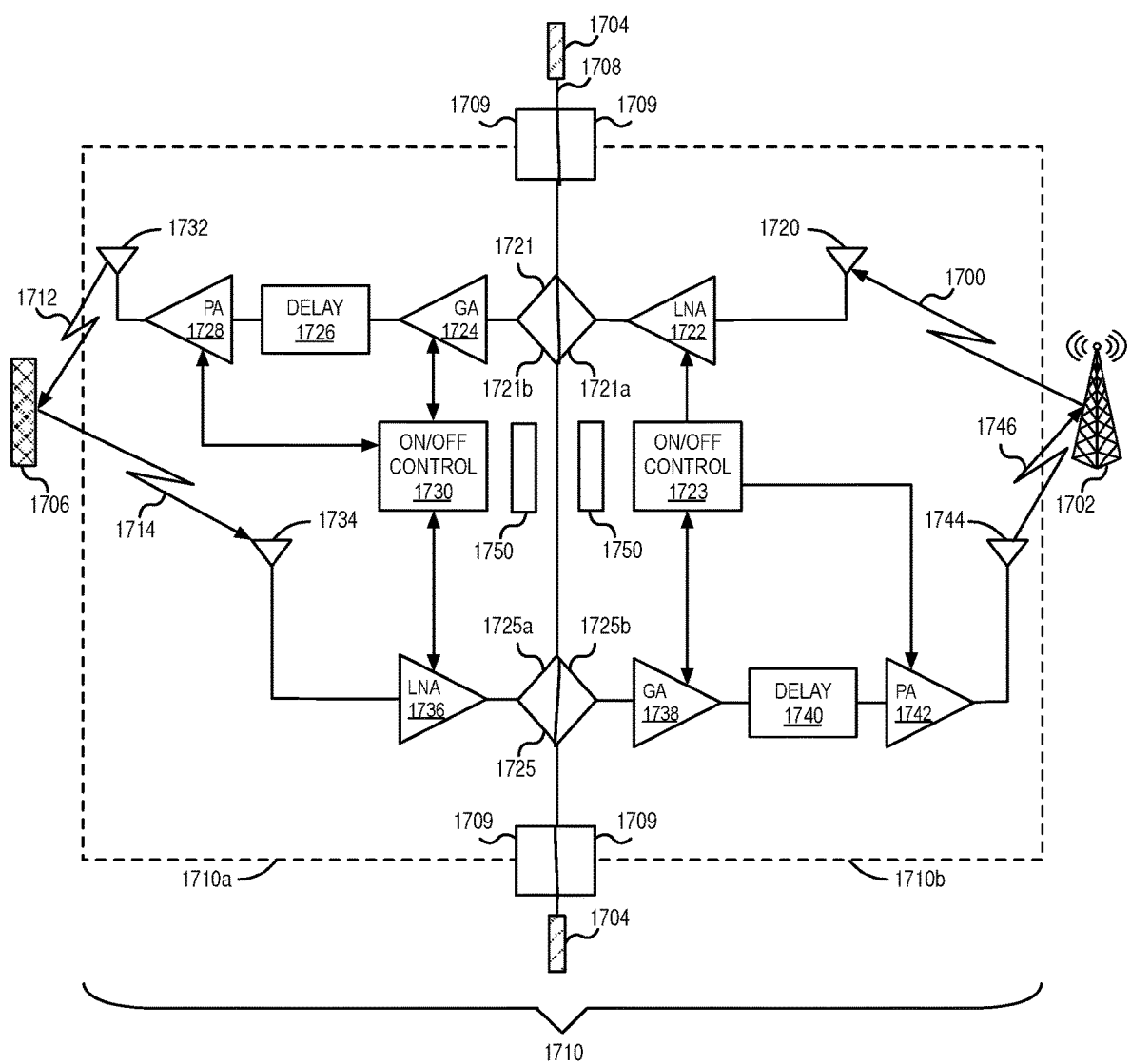
FIG. 17 shows a radio frequency signal being transmitted from the base station to a wireless antenna device.

FIG. 17 illustrates such a problem of RF (e.g., mmWave, microwave) wireless signals 1700 transmitted from base station 1702 trying to enter building 1704 to reach a wireless device 1706. Reference 1706 could be a handy base station (HBS), mobile station (MS), wireless terminal (or terminal unit) such as a mobile phone, consumer premise equipment (CPE), Internet of Things (IoTs) device, computer, tablet computer (e.g., iPad), a video streaming device (e.g., set-top box) and the like. The base station 1702 (including e.g., macro base station, micro base station, small cell, distributed antenna system, Pico cell, and/or Femto cell) transmits signals 1700 to wireless device 1706 but without the current embodiments in place all or a significant portion of the RF (e.g., mmWave, microwave) signals 1700 will be reflected off window 1708 and scattered and attenuated.

FIG. 17 shows the RF (e.g., mmWave, microwave) signals 1700 being transmitted from the base station 1702 to a "through barrier" communication device (or system) 1710 able to autonomously receive RF (e.g., mmWave, microwave) signals 1700 and connect them wirelessly 1712 to at least one wireless device 1706 of a possible plurality of MS wireless devices located inside the building 1704. "Autonomously" shall mean in this disclosure without any digital processing of the received signal. The communication device 1710 is also capable of receiving signals 1714 from the MS wireless device 1706 and transmitting them to the base station 1702. The device 1710 is a two part device made up of an internal (e.g., indoor) unit 1710a and an external (e.g., outdoor) unit 1710b. The two units of the device 1710 may be connected to both sides of an obstacle such as a window (e.g., coated glass) 1708 of building 1704, a wall of building 1704, or a window of a vehicle. When installed, the two units 1710a, 1710b are typically located in "proximity" to each other (i.e., approximately ⅛ inch to 3 feet). The device 1710 can be used anywhere a barrier prevents mmWave and/or microwave transmissions. The barrier could be a wall, window, building and/or some other fixture. The device 1710 can be easily attached to any surfaces such as the window 1708 using magnets, suction cups, or other form of attachment mechanism 1709. The communication device 1710 can be located inside and outside houses, buildings, and/or cars. Each one of the antennas, 1720, 1732, 1734 and 1744 may be a single antenna or a panel comprising of multiple antenna elements, known as antenna array, which may be used for RF beam forming.

Device 1710 is shown with an indoor (first) unit 1710a and outdoor (second) unit 1710b attached to both sides of window 1708. The outdoor unit 1710b receives RF signal (e.g., mmWave signal, microwave signal) 1700 at antenna 1720 from base station 1702 and wirelessly relays the signals through low noise amplifier (LNA) 1722 to a coupler 1721 having an emitter 1721a located in the outdoor unit 1710b and a receiver 1721b located on the other side of the barrier (e.g., window) 1708 in indoor unit 1710a. LNA 1722 may be controlled by On/Off controller 1723. The signal travels through gain amplifier 1724 to power amplifier 1728 and antenna 1732. The signal may travel through gain amplifier 1724 and an optional delay (e.g., phase shifter) 1726 to the power amplifier 1728 and antenna 1732. On/Off controller 1730 senses the RF (e.g., mmWave, microwave) signal based on the power sensor output from the gain amplifier 1724 and controls power amplifier 1728 correspondingly. The RF (e.g., mmWave, microwave) signal 1712 is then transmitted through antenna 1732 to wireless device 1706. The protocol for the signals 1712 transmitted from indoor unit 1710a to wireless device 1706 and signals 1714 transmitted from device 1706 to antenna 1734 may be mmWave, microwave, WiFi, Zigbee, Bluetooth, Long Term Evolution (LTE), LTE-Advanced (LTE-A), LTE-Unlicensed Spectrum (LTE-U), LTE License Assisted Access (LTE-LAA), 4G, and/or 5G. Alternatively, the indoor unit 1710a may be hardwired to a cable (e.g., Ethernet cable) and transmits the signal in that manner to routers and other devices. This system and method allows RF signals to easily penetrate the window 1708 of the building 1704 as well as allow for RF signals from device 1706 to be relayed and transmitted to base station 1702. Antenna 1734 is connected to LNA 1736 which amplifies signal 1714 received from wireless device 1706. The signal is then transmitted through emitter 1725a of coupler 1725 to receiver 1725b located on the other side of the barrier 1708. The signal is then passed to gain amplifier 1738 which is also controlled by an On/Off controller 1723. Gain amplifier 1738 sends amplified signals to power amplifier 1742. The gain amplifier 1738 may send amplified signals through an optional delay (e.g., phase shifter) 1740 to the power amplifier 1742. Power amplifier 1742 connects to antenna 1744 which wirelessly transmits signals 1746 to base station 1702.

In device 1710, gain amplifier 1724, delay 1726, gain amplifier 1738 and delay 1740 may always be on. Such "always on" feature allows RF signals (e.g., mmWave and/or microwave signals) to be autonomously transmitted and received in both directions between the indoor unit 1710a and the outdoor unit 1710b, which eliminates the cost of physical layer (e.g. baseband) circuits. Device 1710 operates automatically based on the RF (e.g., mmWave, microwave) signals received from antenna 1720 or antenna 1734 without the intervention of physical layer controls signal. In an alternative embodiment, the elements of device 1710 may be integrated into chipsets.

RF signals 1700, 1712, 1714 and 1746 may be frequencies into the millimeter wave (mmWave) spectrum (i.e., about 20 GHz to 300 GHz such as, for example, about 24 GHz, 28 GHz, 40 GHz, 60 GHz, 70 GHz, and/or 100 GHz) or, in alternative embodiments, the signals 1700, 1712, 1714 and 1746 may be microwave signals in the range of 0.6 GHz to 20 GHz. For example, signals 1700 and 1712 may have the same frequency. Also, signals 1714 and 1746 may have the same frequency.

Indoor unit 1710a may be powered from an electrical receptacle. However, a challenge is getting power to the outdoor unit 1710b on the outside as most buildings 1704 do not have wall outlets conveniently available outside. Indoor unit 1710a is capable of wirelessly transmitting power to the outdoor unit 1710b from wall outlet. Not only does device 1710 allow for RF signals to pass-through from outside to inside, but also allows power to be supplied through the window 1708 (or a wall) of building 1704 from an internal wall outlet. The through window or through wall power supply transmission may be accomplished by two coils 1750. A first coil 1750 located inside the building and a second coil 1750 located on the outside of the building.

Figure 18:
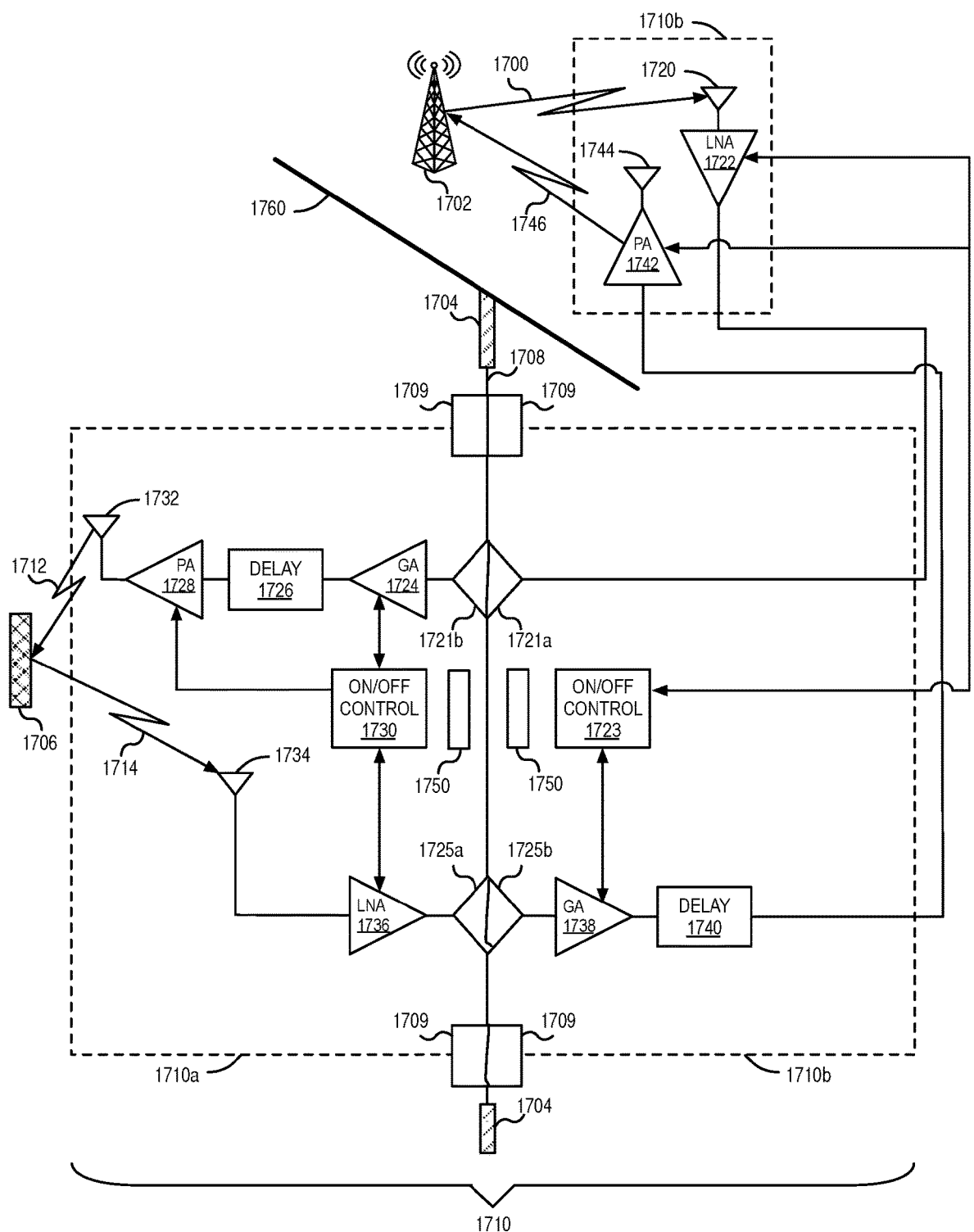
FIG. 18 shows an alternative embodiment to FIG. 17.

FIG. 18 shows an alternative embodiment with outdoor unit 1710b split into two portions. A first portion is attached to the side of a building and a second portion may be mounted in a high point of building 1704 (e.g., on roof 1760). FIG. 18 functions in a manner similar to the embodiment shown in FIG. 17 except receiving antenna 1720 and LNA 1722 are located in the second portion easier to receive signals 1700 from base station. Also, power amplifier 1742 and antenna 1744 are also located in the second portion which allows antenna 1744 to send signals 1746 to base station 1702.

It should be noted that the recitation of ranges of values in this disclosure are merely intended to serve as a shorthand method of referring individually to each separate value falling within the range, unless otherwise indicated herein, and each separate value is incorporated into the specification as if it were individually recited herein. Therefore, any given numerical range shall include whole and fractions of numbers within the range. For example, the range "1 to 10" shall be interpreted to specifically include whole numbers between 1 and 10 (e.g., 1, 2, 3, . . . 9) and non-whole numbers (e.g., 1.1, 1.2 . . . 1.9). The word "about" when accompanying a numerical value is to be construed as indicating a deviation of up to and inclusive of plus or minus 50% from the stated numerical value (e.g., frequency of about 40 GHz shall mean in a frequency range of 20 GHz to 60 GHz and inclusive of fractions between 20 GHz to 60 GHz).

The foregoing described embodiments have been presented for purposes of illustration and description and are not intended to be exhaustive or limiting in any sense. Alterations and modifications may be made to the embodiments disclosed herein without departing from the spirit and scope of the invention. No language in the specification should be construed as indicating any non-claimed element as essential to the practice of the invention. The actual scope of the invention is to be defined by the claims. In the foregoing specification, embodiments have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Although process (or method) steps may be described or claimed in a particular sequential order, such processes may be configured to work in different orders. In other words, any sequence or order of steps that may be explicitly described or claimed does not necessarily indicate a requirement that the steps be performed in that order unless specifically indicated. Further, some steps may be performed simultaneously despite being described or implied as occurring non-simultaneously (e.g., because one step is described after the other step) unless specifically indicated. Moreover, the illustration of a process by its depiction in a drawing does not imply that the illustrated process is exclusive of other variations and modifications thereto, does not necessarily imply that the illustrated process or any of its steps are necessary to the embodiment(s), and does not imply that the illustrated process is preferred.

The definitions of the words or elements of the claims shall include not only the combination of elements which are literally set forth, but all equivalent structure, material or acts for performing substantially the same function in substantially the same way to obtain substantially the same result.

The terms "a", "an" and "the" mean "one or more" unless expressly specified otherwise. The terms "including", "comprising" and variations thereof mean "including but not limited to" unless expressly specified otherwise. The term "plurality" means "two or more" unless expressly specified otherwise. The phrase "at least one of", when such phrase modifies a plurality of things (such as an enumerated list of things) means any combination of one or more of those things, unless expressly specified otherwise. The use of any and all examples, or exemplary language ("e.g." or "such as") provided herein, is intended merely to better illuminate the invention and does not pose a limitation on the scope of the invention unless otherwise claimed.

Neither the Title (set forth at the beginning of the first page of the present application) nor the Abstract (set forth at the end of the present application) is to be taken as limiting in any way as the scope of the disclosed invention(s). The title of the present application and headings of sections provided in the present application are for convenience only, and are not to be taken as limiting the disclosure in any way.

Devices that are described as in "communication" with each other or "coupled" to each other need not be in continuous communication with each other or in direct physical contact, unless expressly specified otherwise. On the contrary, such devices need only transmit to each other as necessary or desirable, and may actually refrain from exchanging data most of the time. For example, a machine in communication with or coupled with another machine via the Internet may not transmit data to the other machine for long period of time (e.g. weeks at a time). In addition, devices that are in communication with or coupled with each other may communicate directly or indirectly through one or more intermediaries.

The invention claimed is:

1. A communication device for passing signals through a barrier comprising:
   an external unit and an internal unit each capable of passing signals autonomously in both directions between the external unit and the internal unit, but in only one direction at a time in each of the external and internal units;
   the external unit having an external receiving antenna, an external transmitting antenna, an external on/off control unit, and an external gain amplifier;
   the internal unit having an internal receiving antenna, an internal transmitting antenna, and an internal on/off control unit, and an internal gain amplifier, wherein the internal unit is located in proximity to the external unit;
   wherein the external unit is capable of receiving a first radio frequency (RF) signal at first frequency, amplifying the first RF signal in an external low noise amplifier (LNA), and transmitting the first RF signal through the barrier to the internal unit; and
   wherein the internal unit is capable of either: i) receiving the first RF signal at the internal gain amplifier, turning off an internal low noise amplifier and turning on an internal power amplifier, and transmitting the first RF signal through the internal power amplifier to the internal transmitting antenna to a wireless device; or ii) receiving a second RF signal at the internal receiving antenna and passing the second RF signal through an internal low noise amplifier to the external unit.

2. The device of claim 1, wherein the wireless device is a handy base station (HBS).

3. The device of claim 1, wherein the wireless device is a mobile station.

4. The device of claim 1, wherein the amplified first RF signal from the external LNA is transmitted wirelessly by an emitter in the external unit through the barrier to the receiver in the internal unit and to the internal gain amplifier.

5. The device of claim 1, wherein the first RF signal frequency is in the range of about 0.6 GigaHertz to 300 GHz.

6. The device of claim 1, further comprising:
   a wireless power transmitter in the internal unit and a wireless power receiver in the external unit; and
   wherein the internal unit is capable of wirelessly transmitting power from the wireless power transmitter to the wireless power receiver.

7. The device of claim 1, wherein the first unit and the second unit are magnetically coupled to each other on either side of the barrier.

8. The device of claim 1, wherein the barrier is a RF wave high transmission loss barrier.

9. The device of claim 1, wherein the barrier is coated glass.

10. The device of claim 1, wherein the internal unit is attached to the inside building side of the barrier and the external unit is attached to the outside building side of the barrier.

11. The device of claim 1, wherein the internal unit is attached to the inside building side of the barrier and the external unit has a first portion proximate to the external unit and a second portion located remotely from the first portion to improve reception.

12. The device of claim 11, wherein the second portion contains the external receiving antenna, the external transmitting antenna, the external LNA and an external power amplifier.

13. The device of claim 1, wherein the barrier is a window of a vehicle.

14. The device of claim 1, wherein the internal unit is attached to the internal side of the vehicle and the external unit is attached to the external side of the vehicle.

15. A method of using a communication device having an external unit and an internal unit to pass signals through a barrier comprising:
   passing the signals autonomously in both directions between the external unit and the internal unit, but in only one direction at a time;
   receiving a first radio frequency (RF) signal operating at a first frequency at a first antenna of an external unit;
   passing the first RF signal through a low noise amplifier to an emitter mounted on the barrier;
   autonomously transmitting the first RF signal to a gain amplifier in the internal unit mounted on the barrier in proximity to the external unit; and
   passing the first RF signal through the internal unit and wirelessly transmitting a signal at the first frequency to a wireless device.

16. The method of claim 15, wherein the first frequency is in a range of 0.6 Giga Hertz (GHz) to 300 GHz.

17. The device of claim 15, wherein the internal unit is attached to the inside of a building and the external unit is attached to the outside of a building side.

18. The device of claim 15, wherein the barrier is a window of a vehicle.

19. The device of claim 15, wherein the internal unit is attached to the internal side of a vehicle and the external unit is attached to the external side of a vehicle.

20. A communication device having an external unit and an internal unit to pass signals through a barrier comprising:
   an external unit and an internal unit each capable of passing signals autonomously in both directions in the external unit and the internal unit, but in only one direction at a time in each of the external and internal units;

the external unit capable of receiving a first radio frequency (RF) signal operating at a first frequency at an external receiving antenna and passing the first RF signal through a low noise amplifier to an emitter mounted on the barrier; and the internal unit capable of autonomously transmitting the first RF signal to an always on internal gain amplifier, turning off an external low noise amplifier and passing the first RF signal through an internal power amplifier to an internal transmitting antenna to a wireless device.

* * * * *